United States Patent
Massie et al.

(10) Patent No.: US 7,411,576 B2
(45) Date of Patent: Aug. 12, 2008

(54) FORCE REFLECTING HAPTIC INTERFACE

(75) Inventors: Thomas H. Massie, Garrison, KY (US); William Alexander Goodwin, Cambridge, MA (US); Elaine Chen, Arlington, MA (US); Deepak Kapoor, Cranston, RI (US); Abbe J. Cohen, Somerville, MA (US); Brandon D. Itkowitz, Natick, MA (US)

(73) Assignee: SensAble Technologies, Inc., Woburn, MA (US)

( * ) Notice: Subject to any disclaimer, the term of this patent is extended or adjusted under 35 U.S.C. 154(b) by 589 days.

(21) Appl. No.: 10/697,963

(22) Filed: Oct. 30, 2003

(65) Prior Publication Data

US 2005/0093821 A1    May 5, 2005

(51) Int. Cl.
*G09G 5/00* (2006.01)
*A63F 9/24* (2006.01)

(52) U.S. Cl. .......................... 345/156; 345/179; 463/38

(58) Field of Classification Search ........................ None
See application file for complete search history.

(56) References Cited

U.S. PATENT DOCUMENTS

| | | |
|---|---|---|
| 2,475,484 A | 7/1949 | De Nise |
| 2,906,179 A | 9/1959 | Bower |
| 3,133,649 A | 5/1964 | Serrell |
| 3,139,990 A | 7/1964 | Jelatis et al. |
| 3,168,203 A | 2/1965 | Gallistel |
| 3,171,549 A | 3/1965 | Orloff |
| 3,241,687 A | 3/1966 | Orloff |
| 3,263,824 A | 8/1966 | Jones et al. |
| 3,269,826 A | 8/1966 | Bumgarner |
| 3,296,882 A | 1/1967 | Durand |
| 3,350,956 A | 11/1967 | Monge |
| 3,409,252 A | 11/1968 | Miller |
| 3,447,766 A | 6/1969 | Palfreyman |
| 3,449,008 A | 6/1969 | Colechia |
| 3,531,868 A | 10/1970 | Stevenson |
| 3,561,263 A | 2/1971 | Ward et al. |
| 3,618,742 A | 11/1971 | Blanchard |
| 3,618,786 A | 11/1971 | Fick |
| 3,620,095 A | 11/1971 | Dane |
| 3,629,826 A | 12/1971 | Cutaia et al. |

(Continued)

FOREIGN PATENT DOCUMENTS

EP    0 458 343    11/1991

(Continued)

OTHER PUBLICATIONS

Adachi, Y., "Touch and Trace on the Free-Form Surface of Virtual Object," Proceedings of IEEE Virtual Reality Annual International Symposium, Sep. 18-22, 1993, Seattle WA, pp. 162-168.

(Continued)

*Primary Examiner*—Richard Hjerpe
*Assistant Examiner*—Mahmoud Fatahi Yar
(74) *Attorney, Agent, or Firm*—Goodwin Procter LLP

(57) ABSTRACT

A multi-function force reflecting haptic interface including various sub-assemblies is disclosed. The sub-assemblies include multiple function user interfaces, a user interface docking station for setting the interface to a home position, temperature monitoring and control systems, and various kinematic cable drive systems.

35 Claims, 24 Drawing Sheets

U.S. PATENT DOCUMENTS

| | | |
|---|---|---|
| 3,637,092 A | 1/1972 | George et al. |
| 3,679,865 A | 7/1972 | Jesnitzer et al. |
| 3,771,037 A | 11/1973 | Bailey, Jr. |
| 3,890,958 A | 6/1975 | Fister et al. |
| 3,919,691 A | 11/1975 | Noll |
| 3,920,972 A | 11/1975 | Corwin, Jr. et al. |
| 3,944,798 A | 3/1976 | Eaton |
| 3,948,093 A | 4/1976 | Folchi et al. |
| 4,021,715 A | 5/1977 | Von Hacht et al. |
| 4,062,455 A | 12/1977 | Flatau |
| 4,150,803 A | 4/1979 | Fernandez |
| 4,216,467 A | 8/1980 | Colston |
| 4,221,516 A | 9/1980 | Haaker et al. |
| 4,229,136 A | 10/1980 | Panissidi |
| 4,260,319 A | 4/1981 | Motoda et al. |
| 4,302,138 A | 11/1981 | Zarudiansky |
| 4,318,096 A * | 3/1982 | Thornburg et al. .......... 345/179 |
| 4,348,142 A | 9/1982 | Figour |
| 4,367,532 A | 1/1983 | Crum et al. |
| 4,420,808 A | 12/1983 | Diamond et al. |
| 4,459,870 A | 7/1984 | Gill et al. |
| 4,477,973 A | 10/1984 | Davies |
| 4,510,574 A | 4/1985 | Guittet et al. |
| 4,511,985 A | 4/1985 | Inaba et al. |
| 4,521,685 A | 6/1985 | Rebman |
| 4,530,155 A | 7/1985 | Burkhardt et al. |
| 4,531,080 A | 7/1985 | Nordstrom et al. |
| 4,555,960 A | 12/1985 | King |
| 4,571,834 A | 2/1986 | Fraser et al. |
| 4,593,470 A | 6/1986 | Davies |
| 4,604,016 A | 8/1986 | Joyce |
| 4,632,341 A | 12/1986 | Repperger et al. |
| 4,638,798 A | 1/1987 | Shelden et al. |
| 4,648,782 A | 3/1987 | Kraft |
| 4,653,011 A | 3/1987 | Iwano |
| 4,654,648 A | 3/1987 | Herrington et al. |
| 4,655,673 A | 4/1987 | Hawkes |
| 4,660,288 A | 4/1987 | Dangschat |
| 4,661,032 A | 4/1987 | Arai |
| 4,670,851 A | 6/1987 | Murakami et al. |
| 4,676,002 A | 6/1987 | Slocum |
| 4,679,331 A | 7/1987 | Koontz |
| 4,680,519 A | 7/1987 | Chand et al. |
| 4,702,668 A | 10/1987 | Carlisle et al. |
| 4,703,443 A | 10/1987 | Moriyasu |
| 4,750,487 A | 6/1988 | Zanetti |
| 4,769,763 A | 9/1988 | Trieb et al. |
| 4,787,051 A | 11/1988 | Olson |
| 4,791,934 A | 12/1988 | Brunnett |
| 4,795,296 A | 1/1989 | Jau |
| 4,800,721 A | 1/1989 | Cemenska et al. |
| 4,806,066 A | 2/1989 | Rhodes et al. |
| 4,819,195 A | 4/1989 | Bell et al. |
| 4,823,634 A | 4/1989 | Culver |
| 4,837,734 A | 6/1989 | Ichikawa et al. |
| 4,839,838 A | 6/1989 | LaBiche et al. |
| 4,849,692 A | 7/1989 | Blood |
| 4,853,874 A | 8/1989 | Iwamoto et al. |
| 4,875,177 A | 10/1989 | Jarman |
| 4,879,556 A | 11/1989 | Duimel |
| 4,887,222 A | 12/1989 | Miyake et al. |
| 4,888,538 A | 12/1989 | Dimitrov et al. |
| 4,888,877 A | 12/1989 | Enderle et al. |
| 4,891,889 A | 1/1990 | Tomelleri |
| 4,893,981 A | 1/1990 | Yoshinada et al. |
| 4,895,039 A | 1/1990 | Hegg |
| 4,907,970 A | 3/1990 | Meenen, Jr. |
| 4,907,973 A | 3/1990 | Hon |
| 4,913,000 A | 4/1990 | Wyllie |
| 4,914,976 A | 4/1990 | Wyllie |
| 4,942,538 A | 7/1990 | Yuan et al. |
| 4,942,545 A | 7/1990 | Sapia |
| 4,945,305 A | 7/1990 | Blood |
| 4,945,501 A | 7/1990 | Bell et al. |
| 4,961,138 A | 10/1990 | Gorniak |
| 4,962,448 A | 10/1990 | DeMaio et al. |
| 4,962,591 A | 10/1990 | Zeller et al. |
| 4,973,215 A | 11/1990 | Karlen et al. |
| 4,978,846 A | 12/1990 | Buote |
| 4,982,504 A | 1/1991 | Söderberg et al. |
| 4,987,301 A | 1/1991 | Nakamura |
| 4,988,981 A | 1/1991 | Zimmerman et al. |
| 5,004,391 A | 4/1991 | Burdea |
| 5,007,085 A | 4/1991 | Greanias et al. |
| 5,007,300 A | 4/1991 | Siva |
| 5,018,922 A | 5/1991 | Yoshinada et al. |
| 5,019,761 A | 5/1991 | Kraft |
| 5,024,116 A | 6/1991 | Kraft |
| 5,038,089 A | 8/1991 | Szakaly |
| 5,039,254 A | 8/1991 | Piercy |
| 5,040,306 A | 8/1991 | McMurtry et al. |
| 5,044,956 A | 9/1991 | Behensky et al. |
| 5,050,608 A | 9/1991 | Watanabe et al. |
| 5,053,975 A | 10/1991 | Tsuchihashi et al. |
| 5,053,976 A | 10/1991 | Nose et al. |
| 5,072,361 A | 12/1991 | Davis et al. |
| 5,088,046 A | 2/1992 | McMurtry |
| 5,088,055 A | 2/1992 | Oyama |
| 5,095,303 A | 3/1992 | Clark et al. |
| 5,103,404 A | 4/1992 | McIntosh |
| 5,105,367 A | 4/1992 | Tsuchihashi et al. |
| 5,115,178 A | 5/1992 | Umeda |
| 5,116,051 A | 5/1992 | Moncrief et al. |
| 5,116,180 A | 5/1992 | Fung et al. |
| 5,128,671 A | 7/1992 | Thomas, Jr. |
| 5,130,632 A | 7/1992 | Ezawa et al. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,148,377 A | 9/1992 | McDonald |
| 5,155,423 A | 10/1992 | Karlen et al. |
| 5,177,563 A | 1/1993 | Everett et al. |
| 5,181,181 A | 1/1993 | Glynn |
| 5,184,319 A | 2/1993 | Kramer |
| 5,185,561 A | 2/1993 | Good et al. |
| 5,187,874 A | 2/1993 | Takahshi et al. |
| 5,189,806 A | 3/1993 | McMurtry et al. |
| 5,193,963 A | 3/1993 | McAffee et al. |
| 5,194,792 A | 3/1993 | Hara |
| 5,198,736 A | 3/1993 | Azuma et al. |
| 5,204,824 A | 4/1993 | Fujimaki |
| 5,220,260 A | 6/1993 | Schuler |
| 5,220,261 A | 6/1993 | Kempas |
| 5,223,776 A | 6/1993 | Radke et al. |
| 5,230,623 A | 7/1993 | Guthrie et al. |
| 5,239,160 A | 8/1993 | Sakura et al. |
| 5,239,246 A | 8/1993 | Kim |
| 5,251,127 A | 10/1993 | Raab |
| 5,251,156 A | 10/1993 | Heier et al. |
| 5,255,211 A | 10/1993 | Redmond |
| 5,259,120 A | 11/1993 | Chapman et al. |
| 5,264,768 A | 11/1993 | Gregory et al. |
| 5,266,875 A | 11/1993 | Slotine et al. |
| 5,275,565 A | 1/1994 | Moncrief |
| 5,320,623 A | 6/1994 | Pennig |
| 5,350,033 A | 9/1994 | Kraft |
| 5,351,692 A | 10/1994 | Dow et al. |
| 5,354,162 A | 10/1994 | Burdea et al. |
| 5,379,663 A | 1/1995 | Hara |
| 5,382,885 A | 1/1995 | Salcudean et al. |
| 5,384,460 A | 1/1995 | Tseng |

| | | | | | | |
|---|---|---|---|---|---|---|
| 5,384,688 A * | 1/1995 | Rockwell ............ 361/736 | 5,854,843 A | 12/1998 | Jacknin et al. | |
| 5,389,865 A | 2/1995 | Jacobus et al. | 5,857,986 A | 1/1999 | Moriyasu | |
| 5,396,265 A | 3/1995 | Ulrich et al. | 5,859,934 A | 1/1999 | Green | |
| 5,397,323 A | 3/1995 | Taylor et al. | 5,872,438 A | 2/1999 | Roston | |
| 5,402,582 A | 4/1995 | Raab | 5,880,714 A | 3/1999 | Rosenberg et al. | |
| 5,414,337 A | 5/1995 | Schuler | 5,889,670 A | 3/1999 | Schuler et al. | |
| 5,417,696 A | 5/1995 | Kashuba et al. | 5,898,599 A | 4/1999 | Massie et al. | |
| 5,418,442 A | 5/1995 | Araki | 5,907,229 A | 5/1999 | Snell | |
| 5,429,140 A | 7/1995 | Burdea et al. | 5,907,487 A | 5/1999 | Rosenberg et al. | |
| 5,436,542 A | 7/1995 | Petelin et al. | 5,910,719 A | 6/1999 | Thorne | |
| 5,438,529 A | 8/1995 | Rosenberg et al. | 5,913,727 A | 6/1999 | Ahdoot | |
| 5,445,166 A | 8/1995 | Taylor | 5,914,705 A | 6/1999 | Johnson et al. | |
| 5,459,382 A | 10/1995 | Jacobus et al. | 5,923,318 A | 7/1999 | Zhai et al. | |
| 5,467,763 A | 11/1995 | McMahon et al. | 5,929,584 A | 7/1999 | Gunnarsson et al. | |
| 5,482,051 A | 1/1996 | Reddy et al. | 5,929,607 A | 7/1999 | Rosenberg et al. | |
| 5,489,830 A | 2/1996 | Fernandez | 5,929,846 A | 7/1999 | Rosenberg et al. | |
| 5,497,452 A | 3/1996 | Shimizu et al. | 5,945,978 A | 8/1999 | Holmes | |
| 5,515,078 A | 5/1996 | Greschler et al. | 5,952,796 A | 9/1999 | Colgate et al. | |
| 5,516,249 A | 5/1996 | Brimhall | 5,952,806 A | 9/1999 | Muramatsu | |
| 5,555,894 A | 9/1996 | Doyama et al. | 5,956,484 A | 9/1999 | Rosenberg et al. | |
| 5,559,412 A | 9/1996 | Schuler | 5,976,122 A | 11/1999 | Madhani et al. | |
| 5,576,727 A | 11/1996 | Rosenberg et al. | 6,020,875 A | 2/2000 | Moore et al. | |
| 5,577,417 A | 11/1996 | Fournier | 6,078,876 A | 6/2000 | Rosenberg et al. | |
| 5,587,937 A | 12/1996 | Massie et al. | 6,104,382 A | 8/2000 | Martin et al. | |
| 5,589,828 A | 12/1996 | Armstrong | 6,111,577 A | 8/2000 | Zilles et al. | |
| 5,589,854 A | 12/1996 | Tsai | 6,125,337 A | 9/2000 | Rosenberg et al. | |
| D377,932 S | 2/1997 | Schena et al. | 6,126,373 A | 10/2000 | Yee et al. | |
| 5,623,582 A | 4/1997 | Rosenberg | 6,132,368 A | 10/2000 | Cooper | |
| 5,625,576 A | 4/1997 | Massie et al. | 6,134,506 A | 10/2000 | Rosenberg et al. | |
| 5,629,594 A | 5/1997 | Jacobus et al. | 6,162,191 A | 12/2000 | Foxlin | |
| 5,642,469 A | 6/1997 | Hannaford et al. | 6,166,723 A | 12/2000 | Schena et al. | |
| 5,666,138 A | 9/1997 | Culver | 6,184,868 B1 | 2/2001 | Shahoian et al. | |
| 5,691,898 A | 11/1997 | Rosenberg et al. | 6,191,365 B1 | 2/2001 | Avellanet | |
| 5,694,013 A | 12/1997 | Stewart et al. | 6,203,614 B1 | 3/2001 | Cherko | |
| 5,701,140 A | 12/1997 | Rosenberg et al. | 6,219,032 B1 | 4/2001 | Rosenberg et al. | |
| 5,706,028 A * | 1/1998 | Murakami et al. ........ 345/157 | 6,219,589 B1 | 4/2001 | Faraz et al. | |
| 5,721,566 A | 2/1998 | Rosenberg et al. | 6,239,784 B1 | 5/2001 | Holmes | |
| 5,724,264 A | 3/1998 | Rosenberg et al. | 6,252,579 B1 | 6/2001 | Rosenberg et al. | |
| 5,731,804 A | 3/1998 | Rosenberg | 6,271,833 B1 | 8/2001 | Rosenberg et al. | |
| 5,734,373 A | 3/1998 | Rosenberg et al. | 6,342,880 B2 | 1/2002 | Rosenberg et al. | |
| 5,737,505 A | 4/1998 | Shaw et al. | 6,344,848 B1 * | 2/2002 | Rowe et al. ............ 345/179 |
| 5,739,811 A | 4/1998 | Rosenberg et al. | 6,346,072 B1 | 2/2002 | Cooper | |
| 5,742,278 A | 4/1998 | Chen et al. | 6,353,850 B1 | 3/2002 | Wies et al. | |
| 5,751,289 A | 5/1998 | Myers | 6,371,952 B1 | 4/2002 | Madhani et al. | |
| 5,754,023 A | 5/1998 | Roston et al. | 6,384,814 B1 * | 5/2002 | Kobayashi et al. ........ 345/179 |
| 5,767,839 A | 6/1998 | Rosenberg | 6,405,158 B1 | 6/2002 | Massie et al. | |
| 5,769,640 A | 6/1998 | Jacobus et al. | 6,411,276 B1 | 6/2002 | Braun et al. | |
| 5,771,181 A | 6/1998 | Moore et al. | 6,417,638 B1 | 7/2002 | Rodomista et al. | |
| 5,774,130 A | 6/1998 | Horikawa et al. | 6,429,846 B2 | 8/2002 | Rosenberg et al. | |
| 5,784,542 A | 7/1998 | Ohm et al. | 6,448,977 B1 | 9/2002 | Braun et al. | |
| 5,790,108 A | 8/1998 | Salcudean et al. | 6,465,772 B1 | 10/2002 | Nelson et al. | |
| 5,792,135 A | 8/1998 | Madhani et al. | 6,476,377 B1 | 11/2002 | Hodge | |
| 5,797,900 A | 8/1998 | Madhani et al. | 6,529,183 B1 | 3/2003 | MacLean et al. | |
| 5,798,752 A | 8/1998 | Buxton et al. | 6,627,870 B1 * | 9/2003 | Lapstun et al. ............ 250/221 |
| 5,800,177 A | 9/1998 | Gillio | 2001/0002098 A1 | 5/2001 | Haanpaa et al. | |
| 5,800,178 A | 9/1998 | Gillio | 2001/0020200 A1 | 9/2001 | Das et al. | |
| 5,800,179 A | 9/1998 | Bailey | 2002/0063685 A1 | 5/2002 | Rosenberg et al. | |
| 5,802,353 A | 9/1998 | Avila et al. | 2002/0097223 A1 | 7/2002 | Rosenberg | |
| 5,803,738 A | 9/1998 | Latham | 2002/0105503 A1 * | 8/2002 | Oueslati et al. ............ 345/173 |
| 5,805,140 A | 9/1998 | Rosenberg et al. | 2002/0126432 A1 | 9/2002 | Goldenberg et al. | |
| 5,807,377 A | 9/1998 | Madhani et al. | 2002/0140673 A1 * | 10/2002 | Tanaka ............ 345/157 |
| 5,808,665 A | 9/1998 | Green | 2002/0163498 A1 | 11/2002 | Chang et al. | |
| 5,814,038 A | 9/1998 | Jensen et al. | 2004/0155862 A1 * | 8/2004 | Higginson ............ 345/156 |
| 5,816,105 A | 10/1998 | Adelstein | | | | |
| 5,816,823 A | 10/1998 | Naimark et al. | | | | |
| 5,821,920 A | 10/1998 | Rosenberg et al. | | | | |
| 5,825,308 A | 10/1998 | Rosenberg | EP | 0 493 795 | 7/1992 | |
| 5,825,983 A | 10/1998 | Park et al. | EP | 0 875 819 | 4/1998 | |
| 5,828,197 A | 10/1998 | Martin et al. | WO | 95/02801 | 1/1995 | |
| 5,828,813 A | 10/1998 | Ohm | WO | 96/16397 | 5/1996 | |
| 5,831,408 A | 11/1998 | Jacobus et al. | WO | 96/22591 | 7/1996 | |
| 5,844,392 A | 12/1998 | Peurach et al. | WO | 96/42078 | 12/1996 | |
| 5,847,528 A | 12/1998 | Hui et al. | WO | 97/06410 | 2/1997 | |

FOREIGN PATENT DOCUMENTS

| | | |
|---|---|---|
| WO | 97/12337 | 4/1997 |
| WO | 97/12357 | 4/1997 |
| WO | 97/19440 | 5/1997 |
| WO | 97/21160 | 6/1997 |
| WO | 97/44775 | 11/1997 |
| WO | 98/06024 | 2/1998 |
| WO | 98/26342 | 6/1998 |
| WO | 98/30951 | 7/1998 |
| WO | 98/58308 | 12/1998 |
| WO | 98/58323 | 12/1998 |
| WO | 99/10872 | 3/1999 |

OTHER PUBLICATIONS

Alper, J., "New Interface Makes Virtual World Tangible," Science Magazine, vol. 283, Feb. 19, 1999; pp. 1097-1098.
Atkinson et al., "Computing with Feeling," Comput. & Graphics, vol. 2, 1977, pp. 97-103.
Baird Industries web page at www.alanbaird.com/index.html, 2000.
Barr, Alan H.; "Global and Local Deformations of Solid Primitives," Computer Graphics; vol. 18, No. 3, pp. 21-30 (Jul. 1984).
Baumann et al., "Haptic Interface for Virtual Reality Based Minimally Invasive Surgery Simulation," Proceedings of the 1998 IEEE International Conference on Robotics and Automation, 1998, vol. 1, pp. 381-386.
Bergamasco, M., "Design of Hand Force Feedback Systems for Glove-like Advanced Interfaces"; Proceedings from the IEEE International Workshop on Robot and Human Communication; Sep. 1992; pp. 286-293.
BioRobotics Lab Home Page, "Mini Direct-Drive Robot," http://rcs.ee.washington.edu/BRL/devises/mrobot/, 4 pages, 2001.
Blinn, J.F., "Simulation of Wrinkled Surfaces," Computer Graphics, vol. 12-3, Aug. 1978, pp. 286-292.
Brooks, Jr. et al., "Project GROPE—Haptic Displays for Scientific Visualization," Computer Graphics, vol. 24, No. 4, Aug. 1990, pp. 177-185.
Burdea, G.C., "Force and Touch Feedback for Virtual Reality," Wiley-Interscience Publication, pp. 190-193, (1996).
Colgate et al., "Implementation of Stiff Virtual Walls in Force-Reflecting Interfaces," Department of Mechanical Engineering, Northwestern University, pp. 202-208, Sep. 1993.
Decaudin, P., "Geometric Deformation by Merging a 3D-Object with a Simple Shape," Graphics Interface Proceedings, May 21-24, 1996, Toronto, Canada.
Dworkin et al., "A New Model for Efficient Dynamic Simulation," Fourth Eurographics Animation and Simulation Workshop Proceedings Eurographic Technical Report Series, ISSN 1017-4656, Sep. 4-5, 1993, pp. 135-147.
Faraz et al., "Design of Haptic Interface Through Stiffness Modulation for Endosurgery: Theory and Experiments," Proceedings of the 1998 IEEE International Conference on Robotics and Automation, May 1998, vol. 2, pp. 1007-1012.
Galyean et al., "Sculpting: An Interactive Volumetric Modeling Technique," Computer Graphics, vol. 25, No. 4, Jul. 1991, pp. 267-274.
Hashimoto et al., "Dynamic Force Simulator for Force Feedback Human-Machine Interaction," IEEE, Sep. 1993, pp. 209-215.
Hasser et al., "Tactile Feedback with Adaptive Controller for a Force-Reflecting Haptic Display, Part 1: Design," Proceedings of the 1996 15th Southern Biomedical engineering Conference, 1996, pp. 526-529.
Hayward et al., "Freedom-7: A High Fidelity Seven Axis Haptic Device with Application to Surgical Training," Draft Paper: Reprints of ISER 1997.
Hirata et al., "3-Dimensional Interface Device for Virtual Work Space," Proceedings of the 1992 IEEE/RSJ International Conference on Intelligent Robots and Systems, Jul. 7-10, 1992, pp. 889-896.
Hirota et al., "Development of Surface Display," Department of Mechano-Informatics, Faculty of Engineering, University of Tokyo, pp. 256-262, 1993.
Howe et al., "Task Perfomance with a Dextrous Teleoperated Hand System," Telemanipulator Technology, Nov. 1992, Proceedings of SPIE, vol. 1833, pp. 1-9.

Immersion Corporation, "Impulse Engine," at http://www.immerse.com, 1997.
Immersion Corporation, "Impulse Engine," Marketing Brochure, 1997.
Immersion Corporation, "Laparoscopic Impulse Engine," at http://www.immerse.com, 1996.
Immersion Corporation, "Laparoscopic Impulse Engine," Marketing Brochure, 1995.
Inoue et al., "Parallel Manipulator," Proceedings of 3rd Robotics Research: The Third International Symposium, Faugeras & Giralt, eds., MIT Press 1986; pp. 321-327.
Ishii et al., "A 3D Interface Device with Force Feedback: A Virtual Work Space for Pick-and-Place Tasks," Proceedings of the 1993 IEEE Virtual Reality Annual International Symposium; pp. 331-335, Sep. 1993.
Iwata, "Artificial Reality with Force-feedback: Development of Desktop Virtual Space with Compact Master Manipulator," Computer Graphics, vol. 24, No. 4, Aug. 1990, pp. 165-170.
Iwata, "Pen-based Haptic Virtual Environment," Proceedings of IEEE Virtual Reality Annual International Symposium, Sep. 18-22, 1993, Seattle, WA, pp. 287-292.
Kelley et al., "Magic Mouse: Tactile and Kinesthetic Feedback in the Human-Computer Interface Using an Electromagnetically Actuated Input/Output Device," Department of Electrical Engineering, University of British Columbia; Oct. 19, 1993, pp. 1-27.
Kilpatrick, "The Use of a Kinesthetic Supplement in an Interactive Graphics System," The University of North Carolina at Chapel Hill, Ph.D Thesis, 1976, pp. 1-175.
Kim and Schenker, "A Teleoperation Training Simulator with Visual and Kinesthetic Force Virtual Reality," Proceedings from the SPIE—The International Society for Optical Engineering, Human Vision, Visual Processing, and Digital Display III, 1992, pp. 560-569.
Kotoku et al., "A Force Display Algorithm for Virtual Environments," SICE, pp. 347-355, 1992.
Kraft Telerobotics, Inc., "GRIPS Force Feedback Manipulator System," Marketing Brochure.
Kraft Telerobotics, Inc., "GRIPS Master/Slave Manipulation System," Marketing Brochure, 1988.
Kraft Telerobotics, Inc., "GRIPS Underwater Manipulator System," Marketing Brochure.
Luecke et al., "Haptic Interaction Using a PUMA 560 and the ISU Force Reflecting Exoskeleton System," Proceedings of the 1997 IEEE International Conference on Robotics and Automation, 1997, vol. 1, pp. 106-111.
Marcus et al., "EXOS Research on Master Controllers for Robotic Devices," Fifth Annual Workshop on Space Operations Applications and Research (SOAR '91), pp. 238-245, Jul. 1991.
Marlow Ropes Web pages: www.marlowropes.co.uk/yachting/halyards.htm,www.marlowropes.co.uk/yachting/construction.htm, Mar. 9, 2001.
Massie, T., "Design of a Three Degree of Freedom Force-Reflecting Haptic Interface," Massachusetts Institute of Technology; Bachelor of Science in Electrical Science and Engineering Thesis, May 1993, pp. 1-38.
Massie, T., "Initial Haptic Explorations with the Phantom: Virtual Touch Through Point Interaction," Massachusetts Institute of Technology, Feb. 1996, pp. 1-49.
Massie, T., "A Tangible Goal for 3D Modeling, IEEE Computer Graphics and Applications," vol. 18, No. 3, May-Jun. 1998, pp. 62-65.
McAffee et al., "Teleoperator Subsystem/Telerobot Demonstrator," Force Reflecting Hand Controller Equipment Manual, Jet Propulsion Laboratory, California Institute of Technology, Jan. 1988, pp. 3-8, 11, A-34.
Midwest Tungsten Service web pages, "TungstenWire History," at www.tungsten.com/tunghist.html, and "tungsten wire for sale," at www.tungsten.com/resalew.html, Jan. 4, 2002.
Millman et al., "A System for the Implementation and Kinesthetic Display of Virtual Environments," SPIE vol. 1833 Telemanipulator Technology, 1992, pp. 49-56.
Minsky et al., "Feeling and Seeing: Issues in Force Display," Computer Graphics, vol. 24, No. 2, Mar. 1990, pp. 235-270.

Monash University Home Page, "2nd Asia Pacific Conference on Systems Integrity and Maintenance On-line course Notes and Lecture Presentations," www-mec.eng.monash.edu.au/body.html, 9 pages, Feb. 12, 1999.

MPB Technologies, Inc., "Freedom 6, Force Feedback Hand Controller," Marketing Brochure.

NASA MUG Home Page, "Advanced Technology and Mission Studies," http://ranier.hq.nasa.gov/, 11 pages, Dec. 8, 1997.

Noll, "Man-Machine Tactile Communication," Polytechnic Institute of Brooklyn, Ph.D. Thesis, 1971, pp. 1-89.

Payne et al., "Distance Field Manipulation of Surface Models," IEEE Computer Graphics & Applications, Jan. 1992, pp. 65-71.

Robotics Research Group Home Page, "Education Robot Workspace," www.robotics.utexas.edu/rrg/education/low_education/robot_workspaces/main.htm, 14 pages, Sep. 5, 2001.

Salcudean and Vlaar, "On the Emulation of Stiff Walls and Static Friction with a Magnetically Levitated Input/Output Device," DSC-vol. 55-1, Dynamic Systems and Control vol. 1 ASME 1994, pp. 303-309.

SensAble Devices, Inc., "PHANToM Haptic Interface," Marketing Brochure, 1995.

Shimoga, K. B., "A Survey of Perceptual Feedback Issues in Dextrous Telemanipulation: Part 1. Finger Force Feedback," published by IEEE Neural Networks Council in IEEE Virtual Reality Annual International Symposium, held Sep. 18-22, 1993 in Seattle, Washington, 1993, pp. 263-270.

Snow et al., "Technical Support Package on Compact Force-Reflecting Hand Controller," NASA Tech Brief, vol. 15, No. 4 from Jet Propulsion Laboratory Report NPO-17851/7348, Apr. 1991, pp. i, 1-3, 1a-11a, 14a, 15a.

Sutter et al., "Response to Reflected-Force Feefback to Fingers in Teleoperations," Proceedings of the NASA Conference on Space Telerobotics, vol. IV, pp. 65-74, NASA JPL, Jan. 1989.

Tanie et al., "Force Display Algorithms," 1993 IEEE International Conference on Robotics and Automation, May 2, 1993, Atlanta, GA, USA, 1993, pp. 60-78.

Terzopoulos et al., "Elastically Deformable Models," Computer Graphics, vol. 21, No. 4, Jul. 1987, pp. 205-214.

Yoshikawa et al., "Construction of Virtual World Using Dynamics Modules and Interaction Modules," Proceedings of the 1996 IEEE International Conference on Robotics and Automation, Apr. 1996, pp. 2358-2364.

International Search Report for International Application No. PCT/US04/036147, mailed from the International Searching Authority on Jul. 6, 2005. (5 pgs).

US 5,903,456, 05/1999, Schena et al. (withdrawn)

* cited by examiner

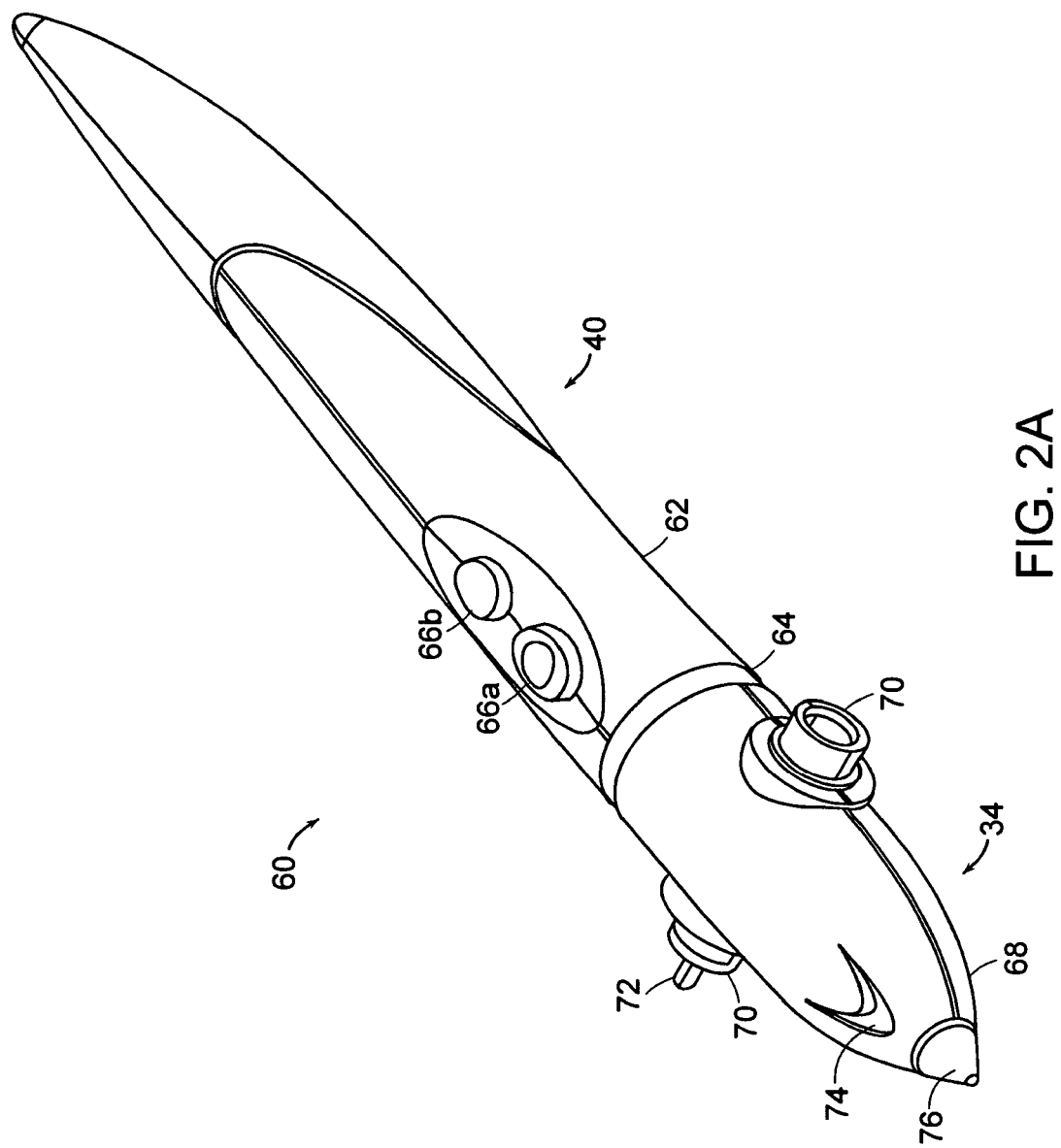

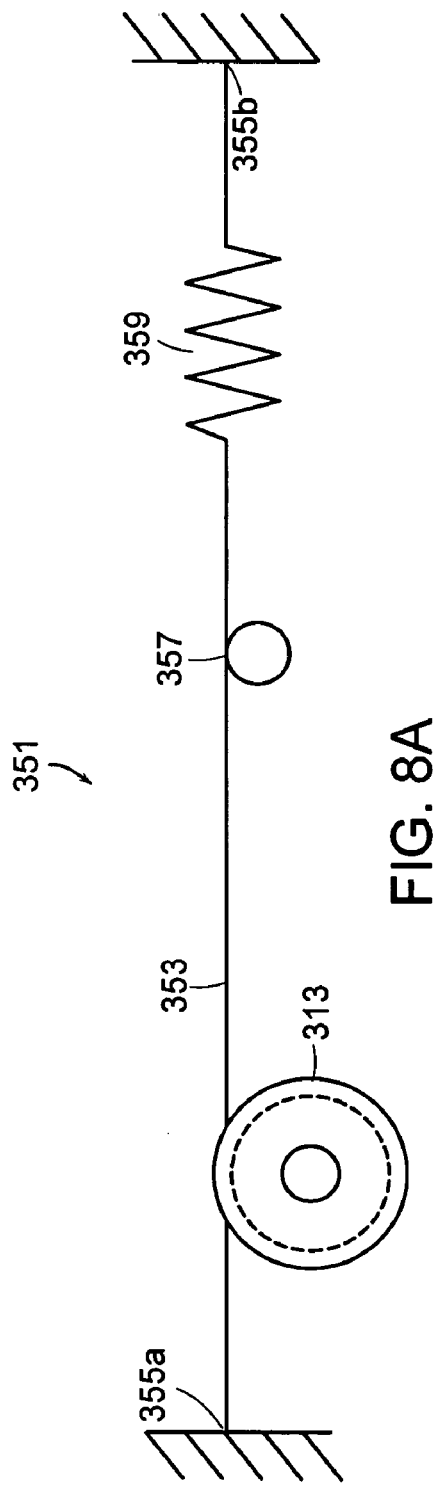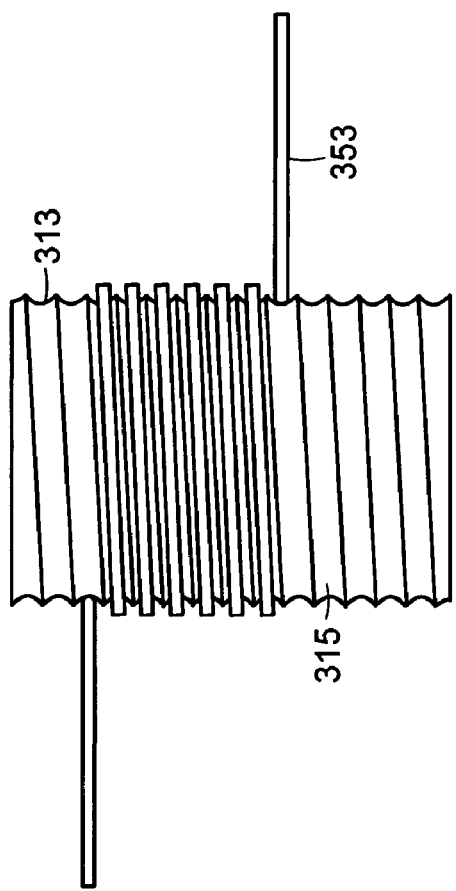

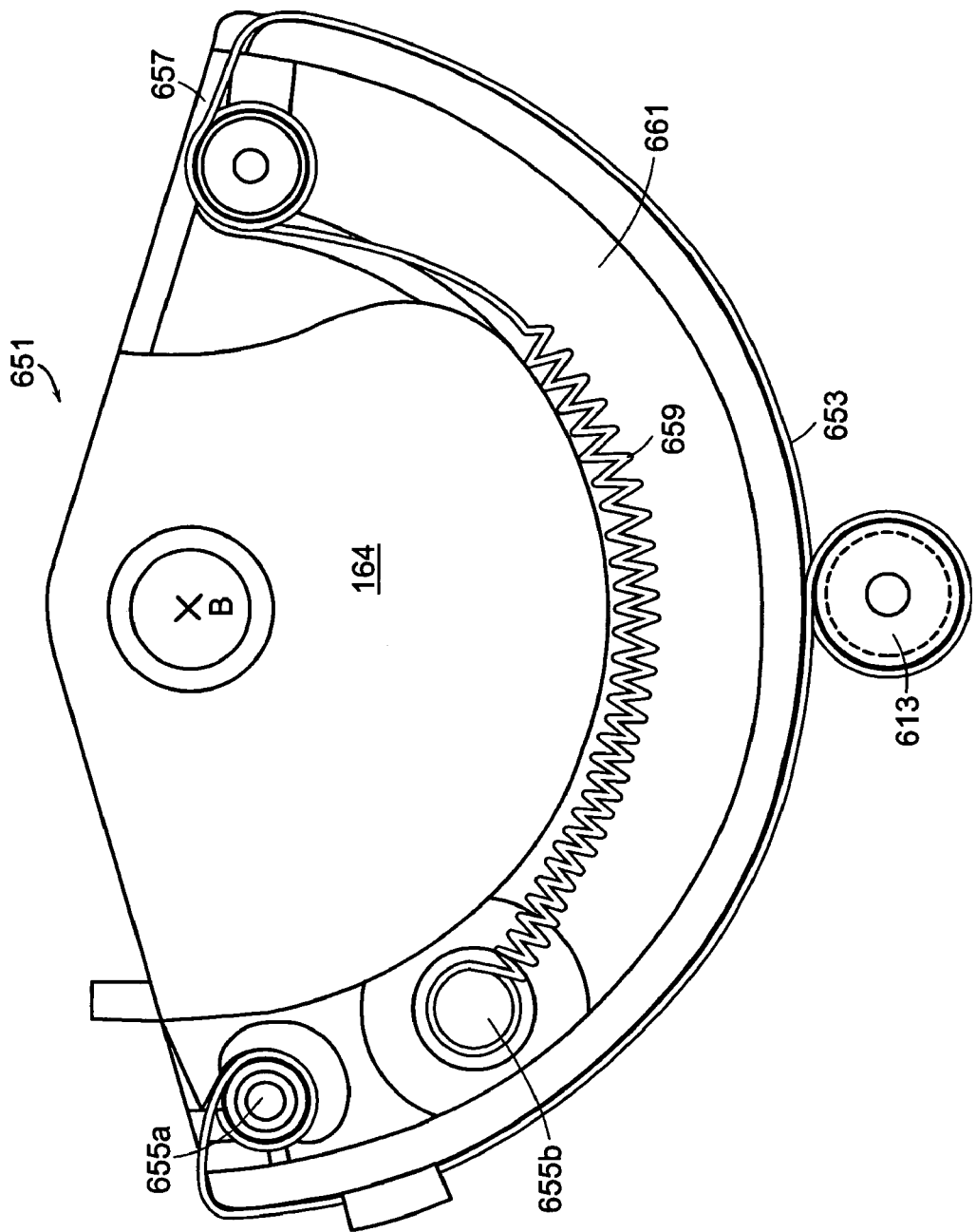

FORCE REFLECTING HAPTIC INTERFACE

TECHNICAL FIELD

The present invention relates generally to a man/machine interface and, more specifically, to a force reflecting haptic interface.

BACKGROUND

Force reflecting haptic interfaces and associated computer hardware and software are used in a variety of systems to provide tactile sensory feedback to a user in addition to conventional visual feedback, thereby affording an enhanced man/machine interface. These systems are becoming more prevalent in such diverse areas as surgical technique training, industrial design and modeling, and personal entertainment.

Two examples of haptic interfaces for use in a desktop environment are disclosed in U.S. Pat. Nos. 5,587,937 and 6,417,638, the disclosures of which are hereby incorporated herein by reference in their entireties. Generally, haptic interfaces define a user reference point located, for example, proximate or within a volume of a user connection element such as a finger thimble or stylus configured to be donned or grasped by a user. Disposed between the user connection element and a spatial or reference ground are a series of mechanical transmission elements such as gimbals, linkages, and frames configured to permit substantially unrestricted movement of the connection element within a predetermined work volume of the haptic interface when in an unpowered state.

Based on the configuration and orientation of the transmission elements, multiple independent degrees of freedom may be provided. Depending on the particular application for the interface, each degree of freedom may be powered and/or tracked, or free, being neither powered nor tracked. For example, a degree of freedom may be powered by a motor or other actuator so that, under appropriate conditions, the interface can resist, balance, or overcome a user input force along that degree of freedom. The powered axis may be active, with force being varied as a function of system conditions, or passive, such as when a constant resistance or drag force is applied. Alternatively or additionally, a degree of freedom can be tracked using an encoder, potentiometer, or other measurement device so that, in combination with other tracked degrees of freedom, the spatial location of the reference point within the work volume can be determined relative to ground. Lastly, a degree of freedom may be free, such that a user is free to move along the degree of freedom substantially without restriction and without tracking within the limits of the range of motion. The interface, in combination with appropriate computer hardware and software, can be used to provide haptic feedback in a virtual reality environment or link a user to an actual manipulator located, for example, in a remote or hazardous environment.

Significant challenges exist in designing a force reflecting haptic interface with appropriate operational and response characteristics. For example, it is desirable that the haptic interface have low friction and weight balance such that a user's movements will not be unduly resisted and the user will not become fatigued merely by moving the connection element within the work volume. It is also desirable that the haptic interface have a high degree of resolution and be highly responsive so as to replicate, as closely as possible, an actual haptic experience. Compact size, low cost, and the interchangeability of various input interfaces are also beneficial attributes from the standpoint of commercial acceptance and appeal.

Nevertheless, the complex technology involved in a force reflecting haptic interface has hampered efforts to reduce size and cost. The architecture of such a device requires unit sizes that are larger than desirable, often because of such factors as motor placement, weight counter-balancing measures, and component size characteristics. Such large unit sizes often drive commercial costs higher, as do the unique components that are required in such a device. The complex technology has also limited the interchangeability of input interfaces, thus requiring the acquisition of a custom device with a specific input interface for each different application.

These limitations on size and cost are presently an unfortunate bar to many markets to which a force reflecting haptic interface is well-suited. For example, lower cost would make such an interface available to consumers, for use with their home personal computers. Use of a haptic interface as a peripheral device would effectively widen the bandwidth of human interaction with the computer, by providing an interface that incorporates a sense of touch, well beyond the standard two-dimensional interaction of sight and sound.

There is, therefore, a need for a force reflecting haptic interface with enhanced functionality that is compact in size and of relatively low cost, so as to be available to a broad consumer market.

SUMMARY OF THE INVENTION

In one aspect, the invention relates to a force reflecting haptic interface including at least three degrees of freedom and a user interface. The user interface includes a nose section and a user connection section detachably coupled to the nose section. The nose section is interchangeable with alternative user connection sections.

In various embodiments of the foregoing aspect of the invention, the user connection section can be a stylus, a pistol grip, a roller ball, a mouse, a joystick, and/or a steering device. In addition, the user connection section can be coupled to the nose section by a jack and chuck arrangement and the user connection section can decouple from the nose section upon application of a load greater than a threshold load value.

In some embodiments, the user interface further includes a first user input and, optionally, a second user input. In additional embodiments, the first user input and/or the second user input is customizable by a user. The user input can be a switch or push-button. Either the first user input or the second user input or both can modify a function of the user interface. In various embodiments, the user interface is adapted to function as a force feedback device, a computer mouse, and/or a digitizer.

The user interface includes a housing. In one embodiment, the housing is made up of multiple components that interlock so as to provide structural integrity and component retention without requiring a fastener. Additionally, the force reflecting haptic interface can include a yoke assembly coupled to the nose section of the user interface. In one embodiment, the yoke assembly includes two hinged halves adapted to capture a pair of projections extending from the nose section. Each projection is adapted to mate with a bearing and at least one of the projections is adapted to mate with a sensor for outputting a signal representative of a position of the user interface relative to the yoke assembly.

In further embodiments, the user interface includes a sensor for outputting a signal representative of a position of the user connection section relative to the nose section. In addition, the user interface may include a docking station. The docking station includes a projection disposed on one of the user interface and a housing of the haptic interface and a mating recess formed in the other of the user interface and the housing. Further, the docking station may include a sensor for indicating mating of the projection in the recess. In another aspect, the invention relates to a force reflecting haptic interface including at least three degrees of freedom and a multiple use user interface. The user interface is adapted to support a first function and a second function. In one embodiment, the user interface is further adapted to support a third function. In various embodiments of this aspect of the invention, the first function is as a force feedback device, the second function is as a computer mouse, and the third function is as a digitizer. In one embodiment, the user interface is switchable between the first function and the second function, and the third function is enabled independently from the first function and the second function.

In another aspect, the invention relates to a docking station for a force reflecting haptic interface including a housing and a user interface. The docking station includes a mating structure and a switch disposed proximate the mating structure. In some embodiments, the mating structure includes a receptacle formed in the housing and the switch is actuatable by insertion of at least a portion of the user interface into the receptacle. Upon actuation of the switch, the haptic interface is set to a home position.

In further embodiments, the docking station includes a retainer for retaining the user interface in the docking station, and the retainer can include a spring loaded projection disposed on one of the user interface and the docking station and a mating recess for receiving the projection disposed on the other of the user interface and the docking station. In addition, the docking station can include an indicator. The indicator can be a visual indicator and can indicate at least one of a fault condition and a status.

In another aspect, the invention relates to a force reflecting haptic interface including at least three degrees of freedom. The haptic interface includes a direct drive assembly having a first actuator for driving a first rotary element and a coaxial transfer drive assembly having a second actuator for driving a second rotary element. The direct drive assembly and the transfer drive assembly are disposed on opposite sides of at least one of the first rotary element and the second rotary element.

In various embodiments of the foregoing aspect of the invention, the direct drive assembly and the transfer drive assembly each include a rotary element or other type of drive element, the respective rotary elements disposed in an opposed coaxial configuration. The force reflecting haptic interface can further include a reflective encoder disposed on one end of at least one of the first actuator and the second actuator and/or a threaded capstan disposed on a shaft of at least one of the first actuator and the second actuator.

In one embodiment, the force reflecting haptic interface includes a base for housing electrical components. The base can include ballast to at least partially, and typically fully, offset forces arising during use of the haptic interface. In one embodiment, the ballast can include a plurality of plates. Further, the force reflecting haptic interface can include an electrical interface in accordance with IEEE 1394. In some embodiments, the force reflecting haptic interface includes an external non-structural housing, wherein the housing can include two halves mounted in opposition on a shaft passing through an axis of rotation of a rotary element. In various embodiments, the force reflecting haptic interface includes a spring for balancing at least one cantilevered rotary element without requiring a counterweight. The spring may be a torsion spring disposed about an axis of rotation of the rotary element.

In another aspect, the invention relates to a force reflecting haptic interface including at least three degrees of freedom and an internal temperature monitoring system without requiring a temperature sensor. In one embodiment, the temperature monitoring system includes circuitry for measuring duration and magnitude of current drawn by an actuator powering at least one of the degrees of freedom. Further, the system calculates a temperature inside the interface based on the measured duration and magnitude. In one embodiment, the system disables at least a portion of the interface if the calculated temperature exceeds a threshold temperature value.

In another aspect, the invention relates to a method of monitoring an internal temperature of a force reflecting haptic interface. The method includes the steps of measuring magnitude of current drawn by an actuator within the interface, measuring duration of the current drawn, and calculating a temperature based upon the magnitude and duration measurements. In one embodiment, the method includes an additional step of disabling at least a portion of the interface if the calculated temperature exceeds a threshold temperature value.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the present invention are described with reference to the following drawings, in which:

FIG. 2A is a schematic perspective view of one embodiment of a user interface for a haptic interface in accordance with one embodiment of the invention;

FIG. 8A is a schematic diagram of an automatic cable tensioning device useful in a haptic interface in accordance with one embodiment of the invention;

FIG. 8B is a schematic side view of an actuator capstan for use in a cable drive in accordance with one embodiment of the invention;

FIG. 10 is a schematic plan view of an automatic cable tensioning device employed to drive a transfer drive element of a third articulation of a haptic interface in accordance with one embodiment of the invention;

DETAILED DESCRIPTION

Figure 1A:
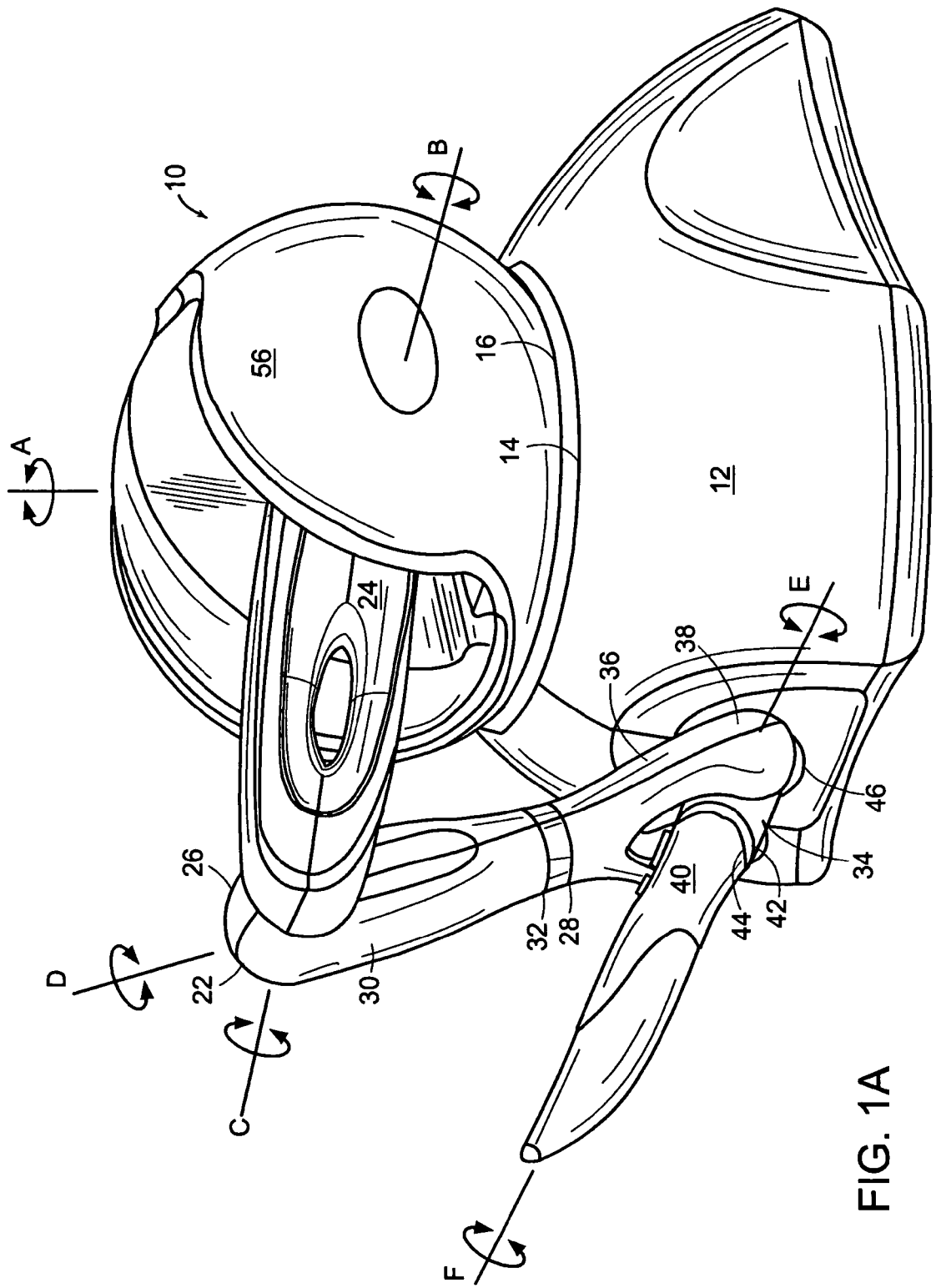
FIG. 1A is a schematic perspective side view of a force reflecting haptic interface in accordance with one embodiment of the invention.

FIG. 1A is a schematic perspective view of a six degree of freedom force reflecting haptic interface 10 in accordance with one embodiment of the present invention. Various features and functions of the inventions can be utilized, with advantage, in interfaces with different configurations, different kinematics, and greater or fewer degrees of freedom. The interface 10 includes a base 12 defining a reference ground, six joints or articulations, and six structural elements. A first powered tracked rotary element 14 is supported by the base 12 to define a first articulation 16 with an axis of rotation "A" having a substantially vertical orientation. A second powered tracked rotary element 18 (FIG. 5) is mounted on the first powered tracked rotary element 14 to define a second articulation 20 (FIG. 5) with an axis of rotation "B" having a substantially perpendicular orientation relative to the first axis, A. A third powered tracked rotary element 22 is mounted on a generally outwardly radially disposed cantilevered extension 24 (in the form of a thigh) of the second element 18 to define a third articulation 26 having an axis of rotation "C" that is substantially parallel to the second axis, B. A fourth free rotary element 28 is mounted on a generally outwardly radially disposed extension 30 (in the form of a shin) of the third element 22 to define a fourth articulation 32 having an axis of rotation "D" that is substantially perpendicular to the third axis, C. A fifth free rotary element 34 in the form of a nose is mounted on a generally outwardly radially disposed extension 36 (in the form of a yoke) of the fourth element 28 to define a fifth articulation 38 having an axis of rotation "E" that is substantially perpendicular to the fourth axis, D. A sixth free rotary user connection element 40 in the form of a stylus configured to be grasped by a user is mounted on a generally outwardly radially disposed extension 42 of the fifth element 34 to define a sixth articulation 44 having an axis of rotation "F" that is substantially perpendicular to the fifth axis, E. When not in use, the nose 34 is secured conveniently within a docking station 46 located on the base 12 of the haptic interface 10. A generally spherical upper housing 56 encloses the internal components, protecting them from damage and contaminants. Interfaces employing more or less than six axes are contemplated and, in any embodiment of the haptic interface, any of the axes may be powered (i.e., controlled by a motor assembly) or free.

Figure 1B:
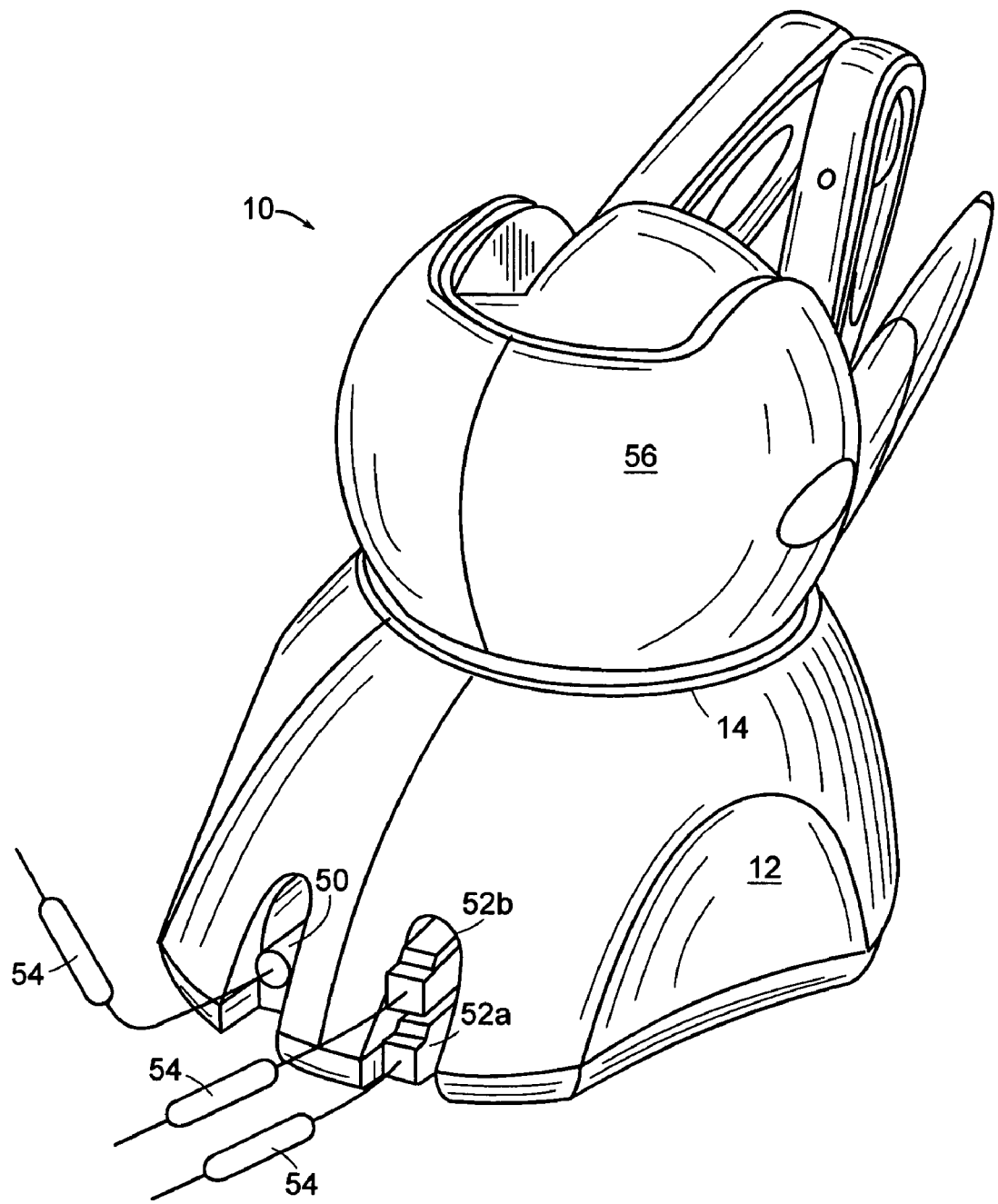
FIG. 1B is a schematic perspective rear view of the force reflecting haptic interface of FIG. 1A.

FIG. 1B is a rear schematic perspective view of the force reflecting haptic interface 10 of FIG. 1A. The haptic interface 10 has at least two connection ports formed in the housing 12. The electrical connections employ a ferrite bead 54 to offer RF shielding, parasitic suppression, and RF decoupling. A power connection 50 supplies electrical power to the interface 10 to operate internal components, including control circuitry, sensors, actuators and display elements. In one embodiment of the force reflecting haptic interface 10 in accordance with the invention, the interface 10 also includes at least two Institute of Electrical and Electronics Engineers (IEEE) 1394 port connections 52a, 52b, such as the FIREWIRE® brand sold by Apple Computer, Inc. Specifically, the interface 10 has both a PHY interface connection (which manages physical interface, CRC checking, pass-through operations, and speed negotiations) and a LINK controller connection (which formats data, and manages isochronous transfers), creating a two-channel interface. IEEE 1394 connections provide many advantages over prior peripheral connection methods. For example, a IEEE 1394 connection transfers data much faster than conventional parallel or serial connections, or even higher speed Universal Serial Bus (USB) connections. The dual-connection embodiment depicted in FIG. 1B enables the haptic interface 10 to operate at 100, 200, and 400 Mbs bus speeds, which is useful for high levels of data transfer in real-time. Such speeds are possible because the connections provide dedicated time slots for data transfer regardless of other operations. In addition, the IEEE 1394 connection automatically recognizes the presence of the peripheral device, without the need for additional installation software.

Figure 1C:
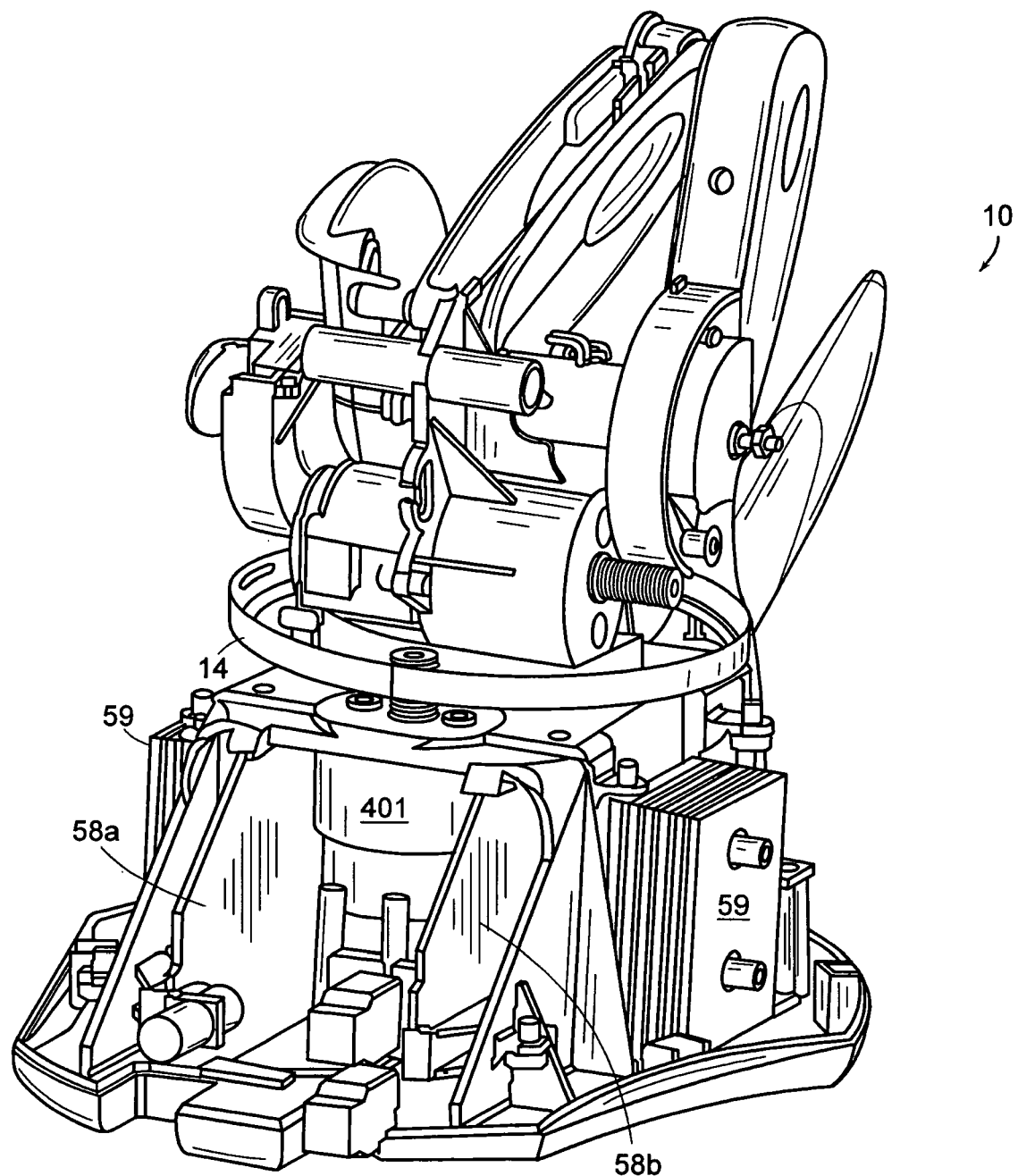
FIG. 1C is another schematic perspective rear view of the force reflecting haptic interface of FIG. 1A with external housing components removed.

FIG. 1C depicts a rear schematic perspective view of the haptic interface 10 with the exterior housings removed. Base 12 is sized to accommodate control circuitry, such as a pair of computer boards, 58a, 58b, in this embodiment arranged substantially vertically within the base 12 and substantially parallel to each other. In this embodiment, power board 58a generally controls the power to the haptic interface 10, while the IEEE 1394 interface board 58b controls complex force feedback, sensing, and other functions. Also contained in the base is the motor assembly 401 for the first powered tracked rotary element 14, and a number of steel plates 59 for ballast, to at least partially offset forces arising during use of the haptic interface 10. Rubberized or suction cup feet disposed on an underside of the interface 10 help stabilize the interface 10 and prevent it from sliding on smooth surfaces. At least one stop within the base 12 prevents over-rotation of rotary element 14.

FIG. 2A depicts a user interface 60 of the haptic interface 10. In one embodiment, the user interface 60 consists of a nose end 34 and a user connection section, such as a stylus 40. In a particular embodiment, the housing of both the nose 34 and stylus 40 are of split construction, for both ease of assembly and component construction, although a single housing component for either the nose 34 and/or stylus 40 is contemplated.

In the embodiment shown in FIG. 2A, two pieces of the stylus housing 62 are removable. Alternatively, the entire housing 62 of the stylus 40 may be split, allowing for its complete removal. In one embodiment, the housing 62 is made in four main pieces to allow for faster assembly. The removable parts of the housing 62 may be secured with a compression ring 64, may snap together, or use other means of joining. The rear portion of the stylus 40 is ergonomically designed and slips on the end of a connector shaft 90 (FIG. 2C) as a sleeve. Two user inputs 66a, 66b are depicted in this embodiment as buttons, but switches, toggles, rollers, or other devices may be used. First input 66a and second input 66b allow the user to control various functions of the stylus 40 and interface 10. In one embodiment, the first input 66a operates as a standard ON/OFF toggle for the force feedback function of the interface 10, while the second input 66b incorporates other system features, although either, both, or neither of the inputs 66a, 66b may be customizable by the user. In one embodiment, for example, pressing the second input 66b allows the user interface 60 and interface 10 to operate in a manner similar to that of a computer mouse without force feedback. Other alternative features of the second input 66b include, but are not limited to, a PAUSE or SLEEP control, force feedback toggle, digitizer control, spatial position reset, or any other option as desired by the user or required for a particular application. Moreover, either button may be used to toggle the haptic interface between two different functions.

The nose housing 68 and stylus housing 62 meet at or near the compression ring 64. In one embodiment (as shown in FIG. 2A) the nose housing 68 is separable into two pieces. Once assembled, the nose housing 68 forms at least two projections 70 that engage bearings 120 of a mating yoke 36. At or near the end of at least one of these projections 70 is a potentiometer blade 72, which drives a potentiometer 130 located within the yoke 36 (FIG. 3B). The outside surface of the nose housing 68 can incorporate at least one recess 74 to engage a spring-loaded projection 154 (FIG. 4A) within the docking station 46 on the base 12 of the haptic interface 10. The recess 74 may be oval, triangular, arcuate, or any other shape that allows for proper engagement with the spring-loaded projection 154. A shaped tip 76 protrudes from or near the tapered end of the nose 34. In one embodiment, the tip 76 may be used for precise tracing of the contours of a physical model or drawing and recording the accompanying data in computer memory, when the haptic interface 10 is used as a digitizer using the inputs 66a, 66b. Although the tapered end of a plastic housing 68 may itself be used for this purpose, a hardened metal tip can be used, as it will more effectively withstand wear. In an alternative embodiment, when functioning as a digitizer, the shaped tip 76 may employ a manual or spring-loaded switch, optical technology, or any other technology known in the art.

Figure 2B:
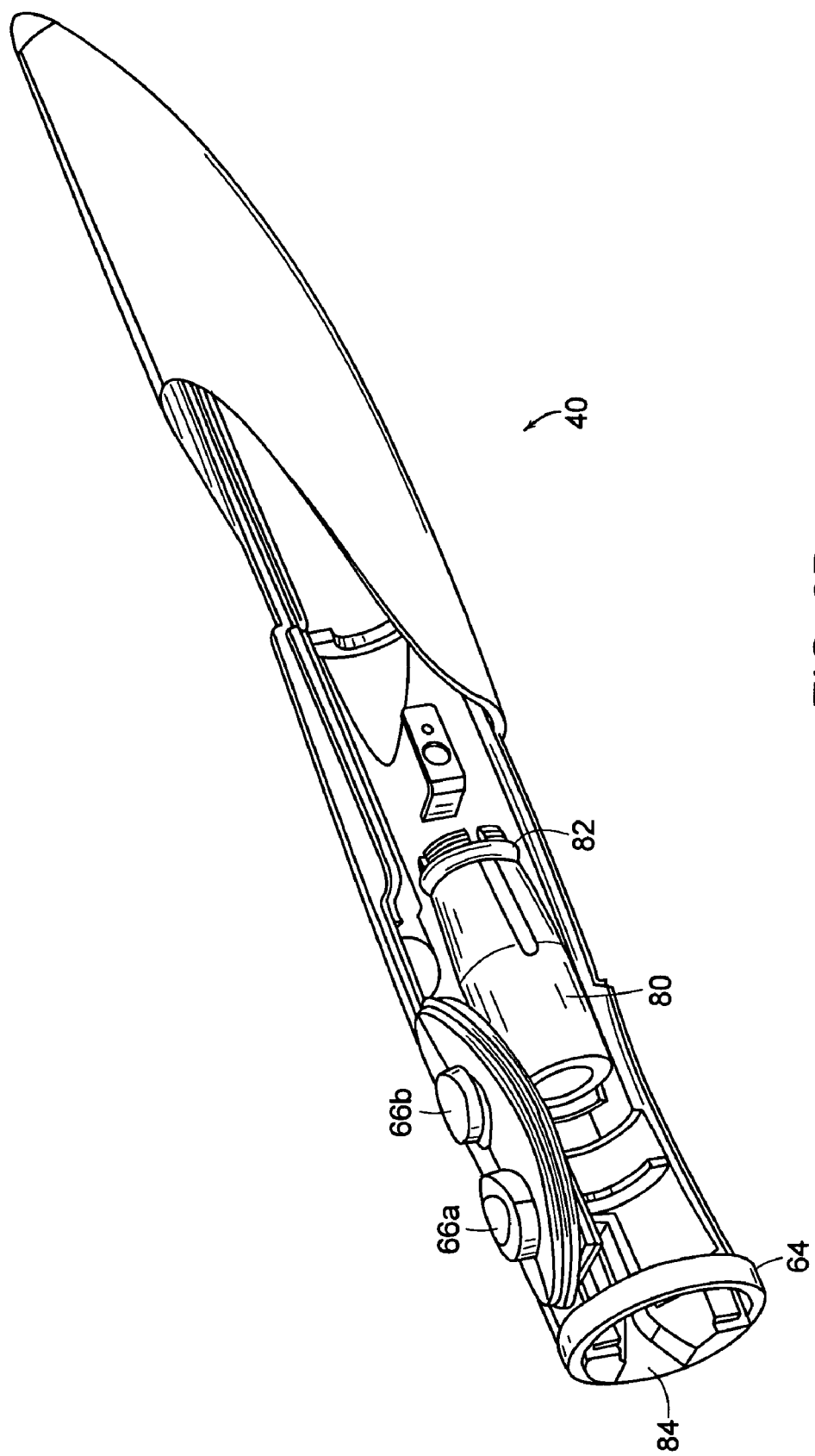
FIG. 2B is a schematic perspective partial sectional view of a user connection end of the user interface of FIG. 2A.
Figure 2C:
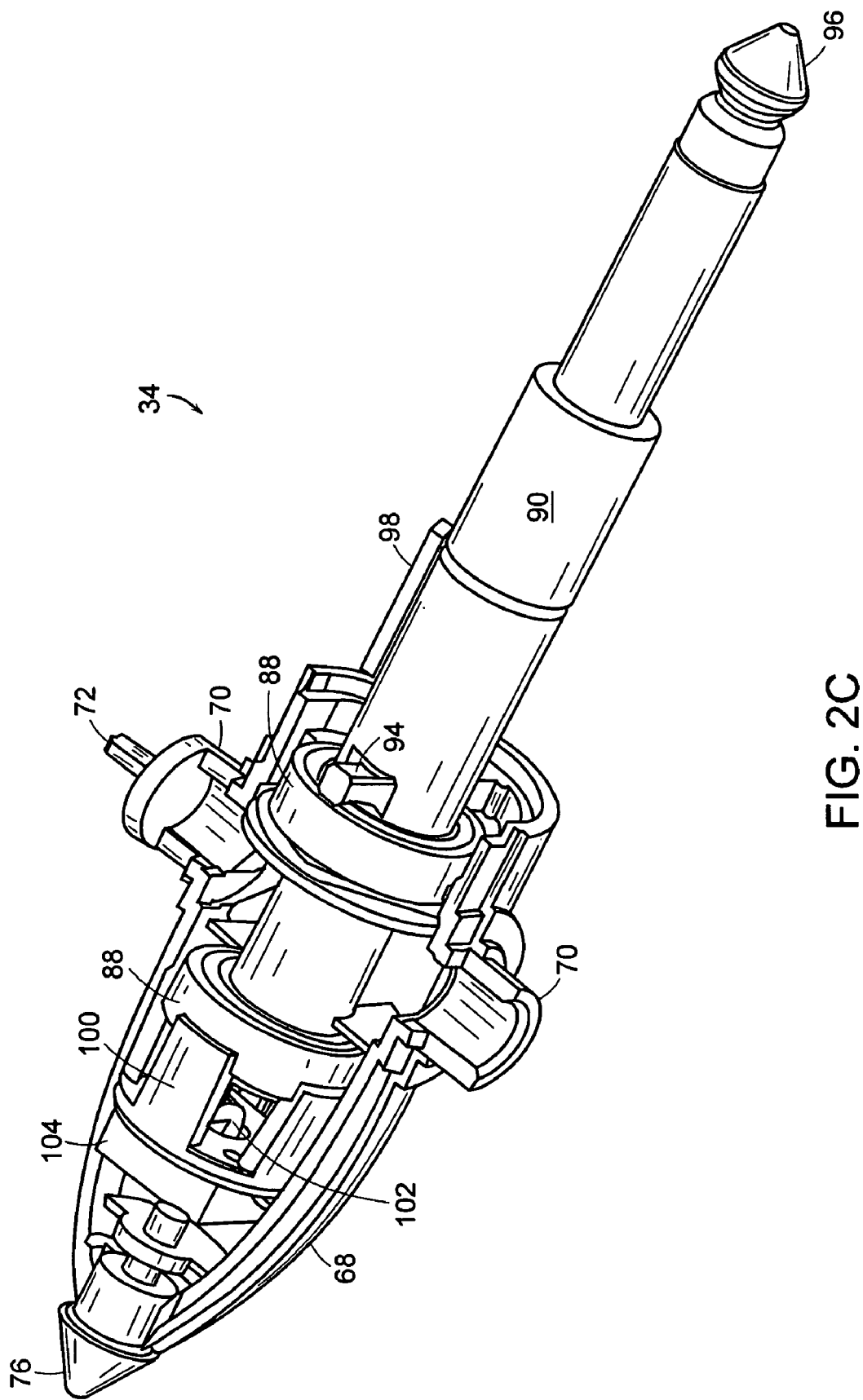
FIGS. 2C-2D are schematic perspective partial sectional and exploded views of a nose end of the user interface of FIG. 2A.

Turning now to FIG. 2B, the stylus 40 is shown with a portion of the housing 62 removed. Within the stylus 40, a snap-type connection 80 serves as a connection element for the two halves for the user interface 60. In this embodiment, a four-jaw snap barrel chuck with an O-ring 82 is used, but any snap-type connection that can properly join with a connector 96 on a connector shaft 90 of the nose 34 may be employed. The O-ring 82 keeps the jaws in a collapsed mode, thus allowing a connector to be trapped therein. The snap-type connection 80 used in the stylus 40 serves at least several purposes. First, the snap-type connection 80 allows for simple changeover of a variety of user connection elements for various applications. Instead of the stylus 40 shown in the figures, pistol-grip, ball, mouse, joystick, steering wheel, or other connections may be employed. Such an arrangement also allows for easy repair or replacement of the user interface 60, should it become damaged. Second, the release characteristics of the snap-type connection 80 prevent damage to the haptic interface 10 if the stylus 40 is aggressively pulled. Generally, the maximum range of force typically applied to the stylus 40 during use is approximately three-quarters to one pound. A breakaway force of about five times the usage force will prevent damage to the haptic interface 10. Moreover, employing a snap-type connection 80 allows the user interface 60 to maintain structural integrity without the need for additional screws or other fasteners. At a point at or near the compression ring 64, a groove 84 is located and sized to mate with a guide 98 of the connector shaft 90 (FIG. 2C). The groove 84 can either be formed within a portion of the housing 62, or may be formed by a gap where the two removable portions of the housing 62 join.

Figure 2D:
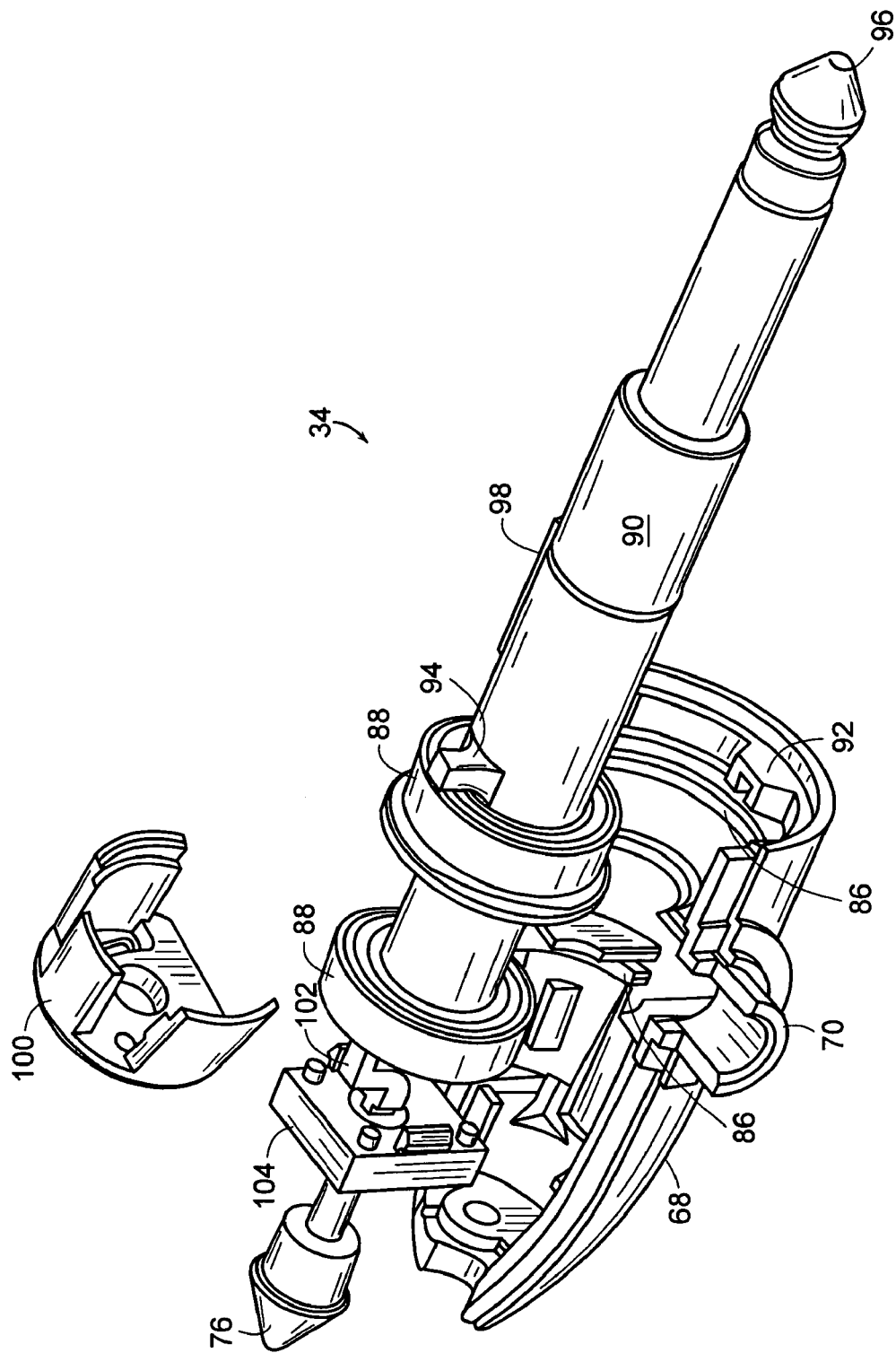

Referring to FIGS. 2C and 2D, the nose 34 of the interface 60 is shown with a portion of the housing 68 removed. Moreover, FIG. 2D depicts a partially exploded nose 34 of the user interface 60. Within the housing 68, bearing seats or rests 86 provide a location for at least one set of bearings 88. In one embodiment, use of a plurality of bearings 88 to support the connector shaft 90 eliminates undesirable play in the user interface 60. A first stop 92 located within the housing 68 engages a second stop 94 on the connector shaft 90 to prevent over-rotation of the connector shaft 90. The first stop 92 also prevents the bearings 88 from moving axially within the nose 34, which could result in damage to the connector shaft 90 and nose 34.

Contained partially within the nose housing 68 is the connector shaft 90. The distal end of the shaft 90 is a conical connector 96 that serves as the joining element between the nose 34 and stylus 40. In one embodiment, a conical connector similar to an audio device jack is employed, but diamond, tapered cylinder, and other non-conical shapes also may be used, provided they mechanically interlock with the snap-type connection 80 in the stylus 40. A guide 98 extends radially outward from the connector shaft 90 and is sized to mate with the groove 84 on the stylus 40. The connector shaft 90 is supported by at least one set of bearings 88, which allows for low-friction rotation of the shaft 90 within the housing 68. Ball, needle, roller, or other types of bearings may be used. A potentiometer retainer 100 also prevents non-rotational motion of the shaft 90, by securing the bearings 88, as well as a potentiometer 104. Generally, potentiometers are of the type that employ a floating central disk, similar to those of the 251 Series, manufactured by CTS Corp., are used in the haptic interface 10, although other sensors for outputting a signal representative of position may be employed. At a location within the housing 68, a potentiometer blade 102 joins the connector shaft 90 at or near its terminus. A plurality of wires (not visible) exit the potentiometer 104 and are routed via the interior portions of the nose 34, yoke 36, shin 30, and thigh 24 to the computer boards within the base 12 of the haptic interface 10. Finally, the digitizing tip 76 is secured within the tapered end of the housing 68.

As a user grips and rotates the stylus 40, the rotational force is directed via the groove 84 to the guide 98. As the guide 98 is a part of the connector shaft 90, the shaft rotates about the F axis. This movement of the connector shaft 90 rotates the potentiometer blade 102, which in turn drives the potentiometer 104. Electronic output signals are then directed through the wiring back to the computer boards of the haptic interface 10.

Figure 3A:
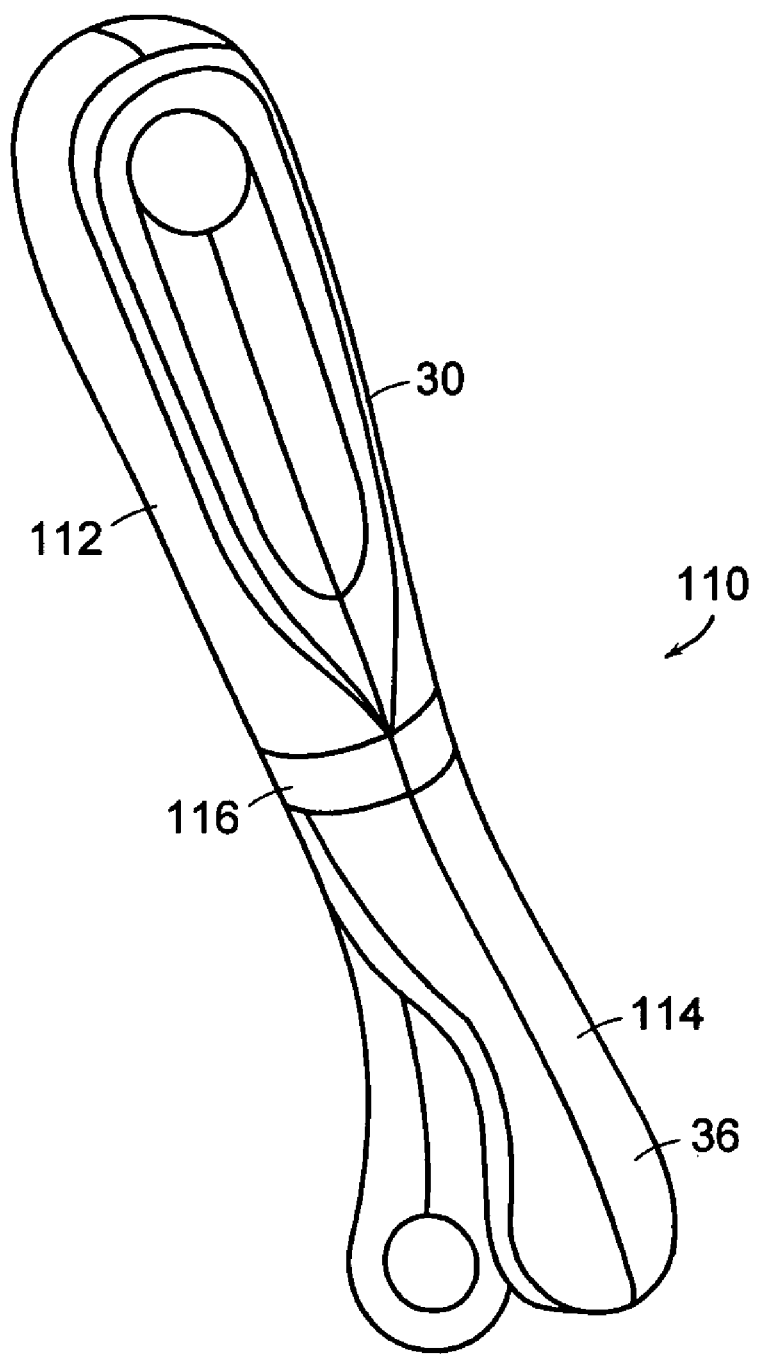
FIG. 3A is a schematic perspective view of a yoke arm assembly for a haptic interface in accordance with one embodiment of the invention.
Figure 3B:
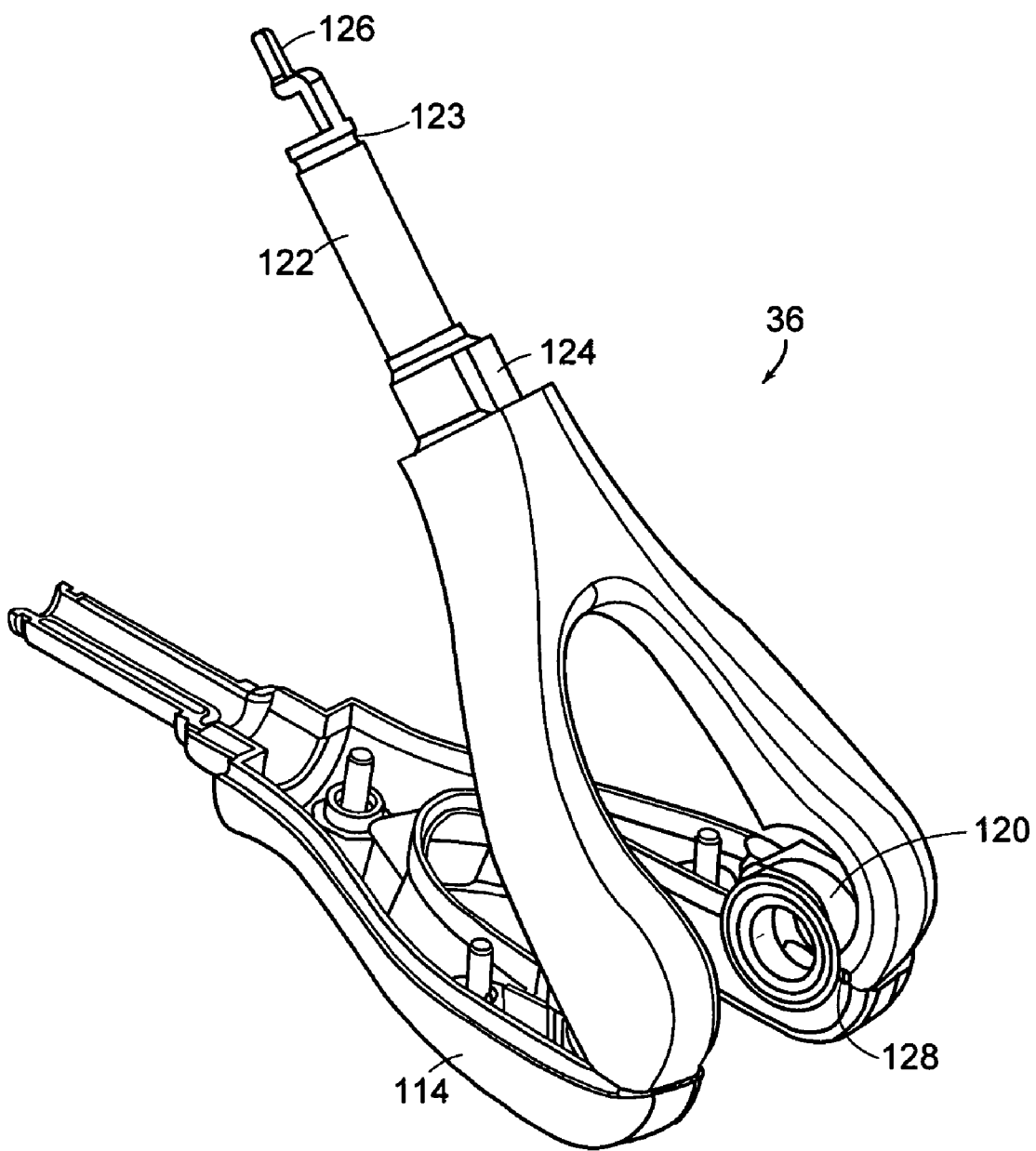
FIG. 3B is a schematic perspective view of the hinged yoke of the yoke arm assembly of FIG. 3A.

FIG. 3A depicts a yoke arm assembly 110 of the haptic interface 10. In one embodiment, the yoke arm 110 consists of two main parts, the shin 30 and the yoke 36. The shin 30 and yoke 36 are joined at or near the midpoint of the yoke arm 110. At this connection point, a shin band 116, integral to housing 114, contains a stop (not shown) which engages stop 124 (FIG. 3B). The other end (opposite the connection point 116) of the shin 30 rotatably connects to the thigh 24 of the haptic interface 10, and the opposite end of the yoke 36 rotatably connects to the nose 34 of the user interface 60. In one embodiment, both the shin 30 and yoke 36 are of split construction, for ease of assembly and component construction. For example, the split design allows for the component parts to be designed so they positively clamp the bearings 120 with pressure at all times, such that there is no play or sloppiness during use. By ensuring essentially zero backlash, very high system resolution and responsiveness can be achieved.

FIG. 3B depicts the yoke 36 of the yoke arm assembly 110. As can be seen, the branches of the yoke 36 are joined by two hinge pins 118 that allow for easy assembly of the housing 114 and eliminate the need for screws or other fasteners. In an alternative embodiment, a molded flexible joint may be used in lieu of hinge pins 118. The use of the split housing 114 also allows the bearings 120 to be clamped with positive pressure at all times to eliminate play and backlash in the device. Use of a yoke 36 in this embodiment instead of a cantilever connection eliminates looseness and play in the device, which would be otherwise felt by the user, without the need for other mechanical reinforcements. Each branch of the yoke 36 contains at least one bearing 120 that joins one of the projections 70 on the nose 34. The bearings 120 provide low-friction rotational movement of the projections 70 within each branch of the yoke 36. The yoke 36 joins the yoke shaft 122 at a point at or near the shin band 116. Extending radially outward from the yoke shaft 122 is a first stop 124, designed to prevent over-rotation of the yoke shaft 122 by contacting a corresponding second stop on the inside circumference of the shin band 116. The terminus of the yoke shaft 122 joins a blade 126 which drives a potentiometer 136 contained within the shin 30 of the yoke arm assembly 110. A groove 123 is sized to receive a retaining ring to prevent the axial movement of the yoke shaft 122.

Figure 3C:
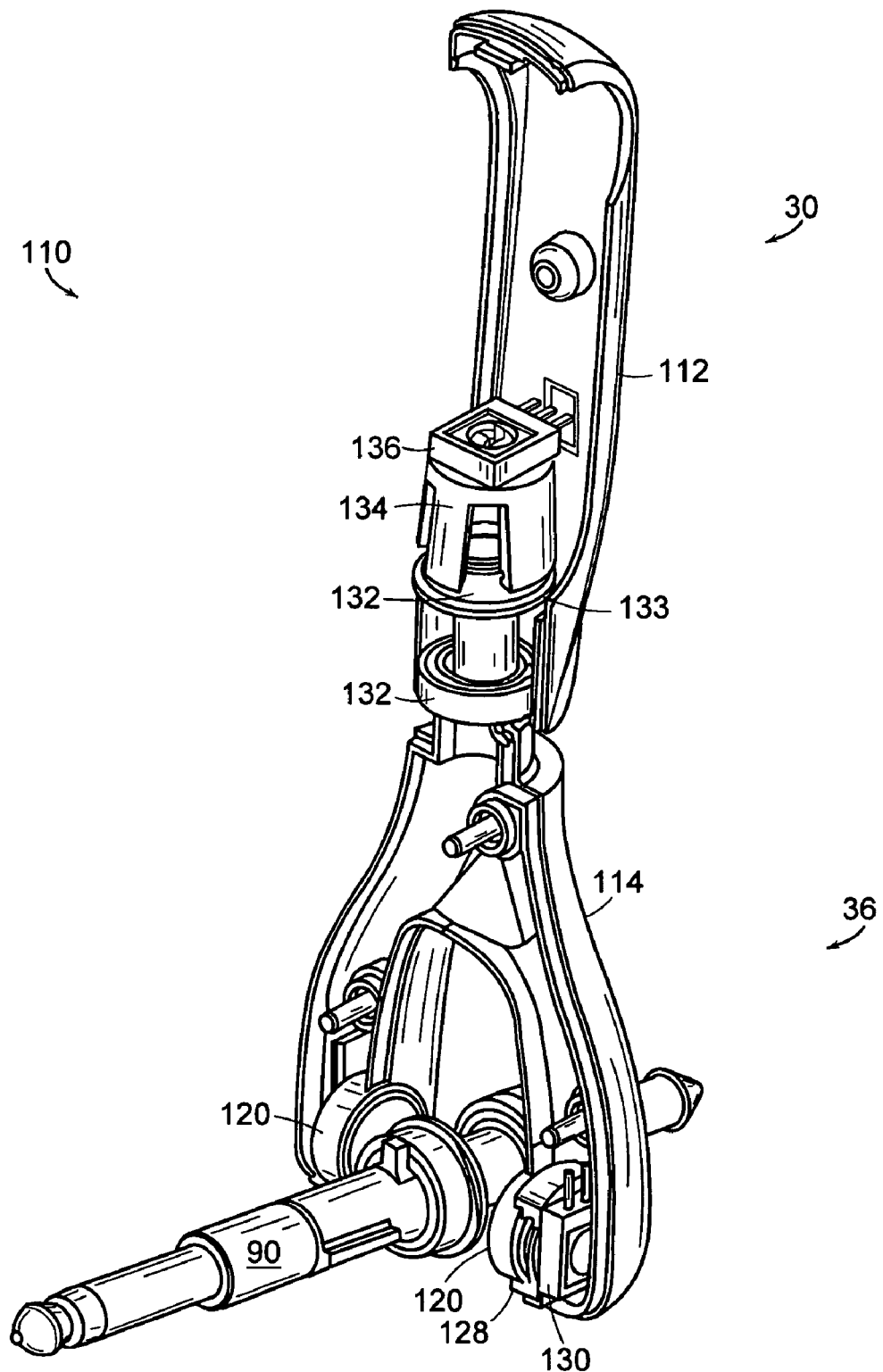
FIG. 3C is a schematic perspective partial sectional view of a portion of the yoke arm assembly of FIG. 3A and the nose.

Turning now to FIG. 3C, the yoke arm assembly 110 is shown with portions of the housings 114, 112 of both the shin 30 and yoke 36 removed. At least one branch of the yoke 36 also contains a potentiometer retainer 128 and a potentiometer 130, which are arranged such that the retainer 128 is between the bearing 120 and the potentiometer 130. A plurality of wires (not shown) exit the potentiometer 130 and are routed via the interior portions of the yoke 36, shin 30, and thigh 24, to the computer boards within the base 12 of the haptic interface 10. The yoke shaft 122 extends from the yoke 36 into the shin 30, and rotates about the D axis within the housing 112, supported by at least one set of bearings 132. In one embodiment, use of a plurality of positively clamped bearings 120 to support the yoke shaft 122 eliminates undesirable play in the yoke arm assembly 110. Additionally, a retention ring 133 prevents axial movement of the yoke shaft 122. A potentiometer retainer 134 prevents non-rotational motion of the yoke shaft 122 by securing the bearings 132 and also prevents movement of the potentiometer 136. A plurality of wires (not shown) exit the potentiometer 136 and are routed via the interior portions of the yoke 36, shin 30, and thigh 24, to the main computer board within the base 12 of the haptic interface 10.

As a user manipulates the stylus 40, certain forces are transferred to the nose 34, causing the projections 70 to rotate within the bearings 120 of the yoke 36. This movement of the projections 70 in turn rotates the potentiometer blade 72 about the E axis, which drives the potentiometer 130. Electronic output signals are then directed through the wiring back to the computer boards of the haptic interface 10. Similarly, as the user manipulates the stylus 40, certain forces are transmitted via the nose 34 and projections 70 to the yoke 36, causing the yoke 36 to rotate. As the yoke 36 is joined to the yoke shaft 122, the shaft 122 rotates about the D axis. This movement of the yoke shaft 122 rotates the potentiometer blade 126, which in turn drives the potentiometer 136. Electronic output signals are then directed through the wiring back to the computer boards of the haptic interface 10.

Figure 4B:
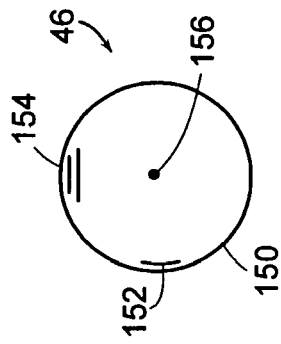
FIG. 4B is a schematic front view of the docking station of FIG. 4A.
Figure 4A:
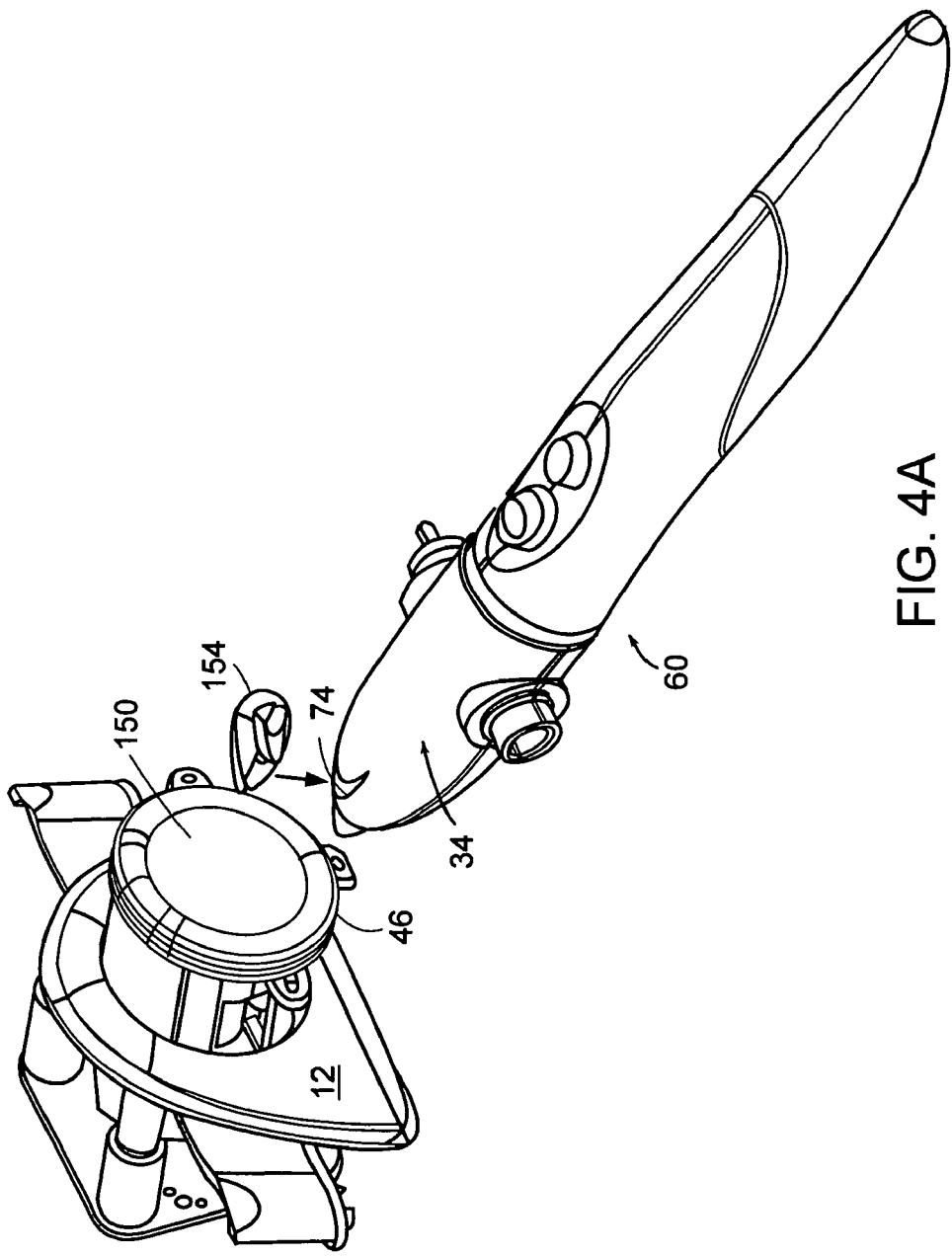
FIG. 4A is a partially exploded schematic perspective view of an embodiment of a docking station and user interface for use in a haptic interface in accordance with one embodiment of the invention.

FIG. 4A depicts a partially exploded docking station 46 used in the haptic interface 10. The docking station 46 is secured within the base 12 of the haptic interface 10, and serves as a resting point and home position for the nose 34 of the interface 60. A tapered barrel 150 of the docking station 46 is configured to receive the nose 34. A spring loaded projection 154 within the barrel 150 mates with the recess 74 on the nose 34, thereby retaining the interface 60 within the docking station 46. Alternatively, other types of retaining mechanisms such as magnets or compression rings may be employed. Also, other embodiments of the present invention may incorporate a male docking station 46 with a female connection on the nose 34 of the user interface 60.

Figure 4C:
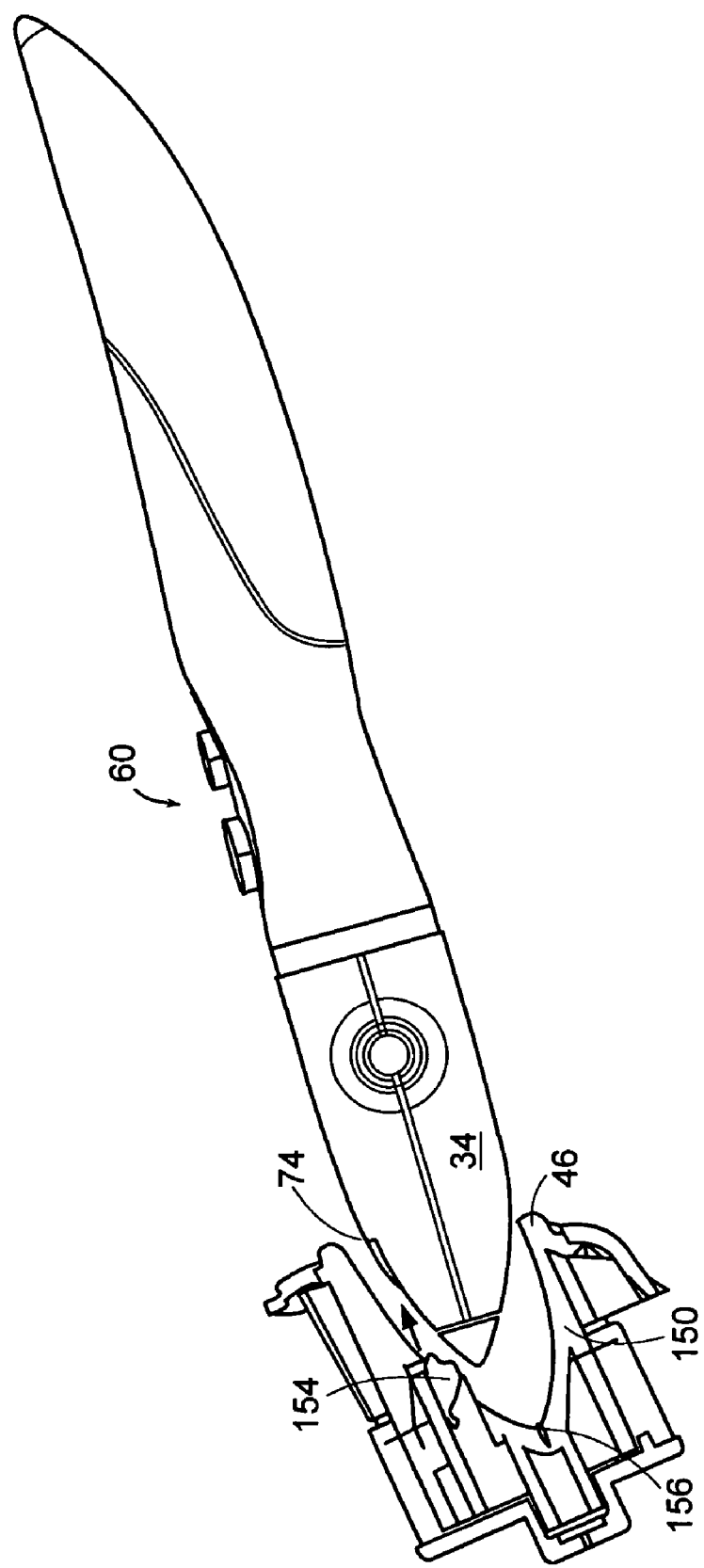
FIG. 4C is a schematic cross-sectional side view of the docking station and user interface of FIG. 4A.

Now referencing FIGS. 4B and 4C, a schematic view directed down the barrel 150 of the docking station 46 and a cross-sectional side schematic view of the docking station 46 are depicted, respectively. In addition to functioning as a rest position for the nose 34, elements disposed within the tapered barrel 150 of the docking station 46 can serve other functions of the haptic interface 10. A switch 152 is located on the inner circumference of the barrel 150 and detects the presence of the nose 34 and recalibrates the position of the interface 10 to home. Thus, a user may reset the spatial position of the entire interface 10 to a zero position or a user-defined home position, as required. Other embodiments of the haptic interface 10 allow the user to reset the spatial position of the interface 10 by manually pressing an input on the user interface 60, without the need for docking the interface 60. In one embodiment, an LED 156 is located at the base of the tapered barrel 150. The LED 156 may signal a variety of diagnostic functions and/or errors by emitting various colors of different characteristics. For example, the LED 156 may blink to remind the user to dock the nose 34 at the completion of a program. A red strobe emission may be used to indicate a diagnostic problem with the haptic interface 10 or stylus 40. Also, a steady green light, for example, may indicate that the haptic interface 10 is functioning properly. In one embodiment, the LED 156 is a blue neon pipe. Any of various combinations of light colors and emission patterns can be used to signal status or prompt the user. As one alternative to the LED 156 in the base of the tapered barrel 150, the barrel 150 itself may be constructed of a clear plastic material. By energizing LEDs 156 installed proximate this clear barrel 150, the entire barrel 150 would emit light, which could be more visible to a user and be more visually appealing.

Figure 5:
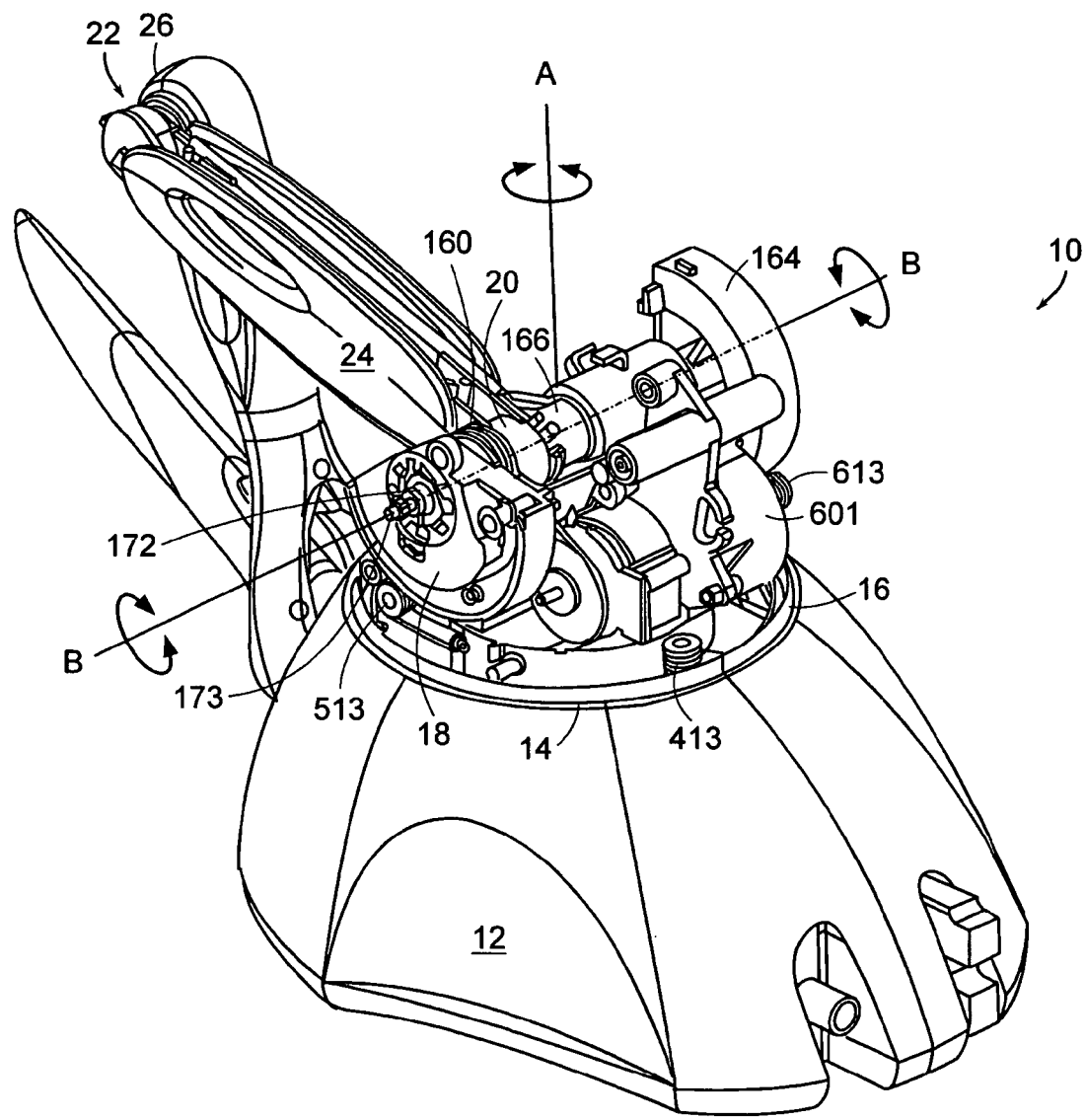
FIG. 5 is a rear schematic perspective view of an embodiment of an internal drive system for use in a haptic interface in accordance with one embodiment of the invention.
Figure 7:
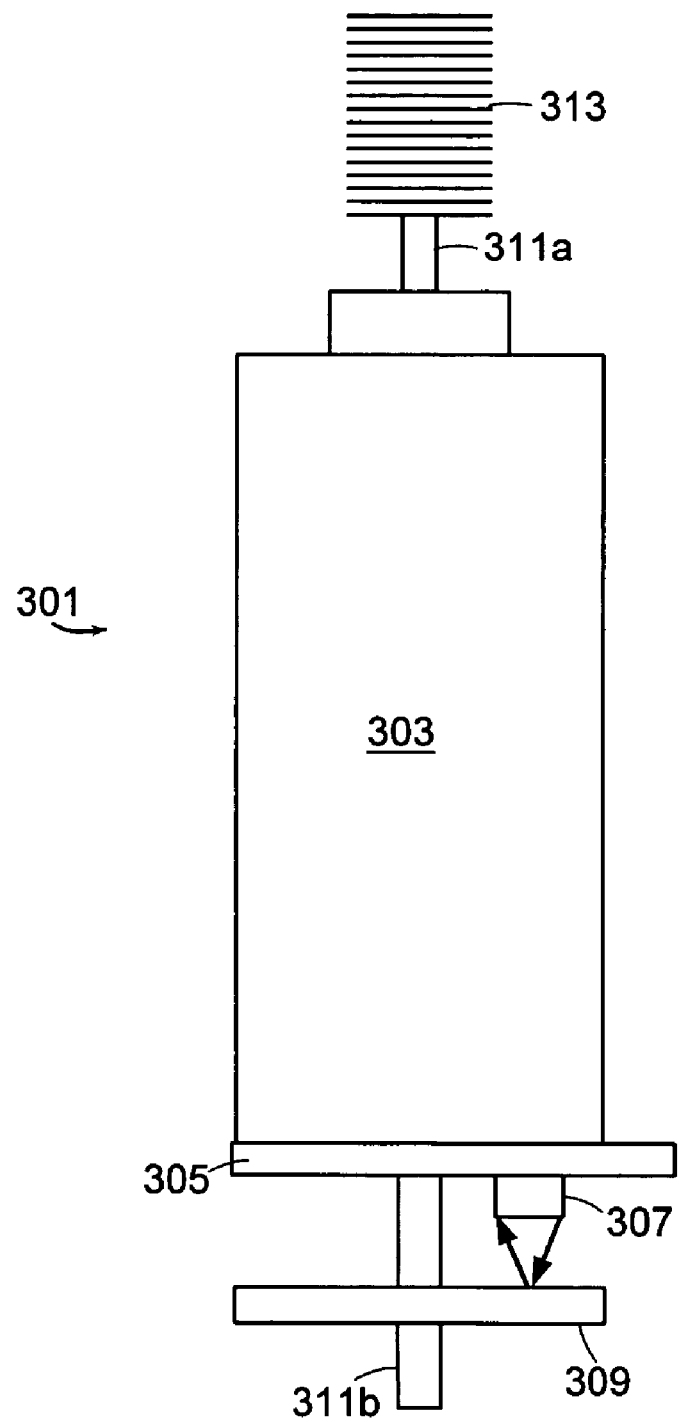
FIG. 7 is a schematic side view of an embodiment of an actuator assembly for use in the haptic interface in accordance with one embodiment of the invention.
Figure 8C:
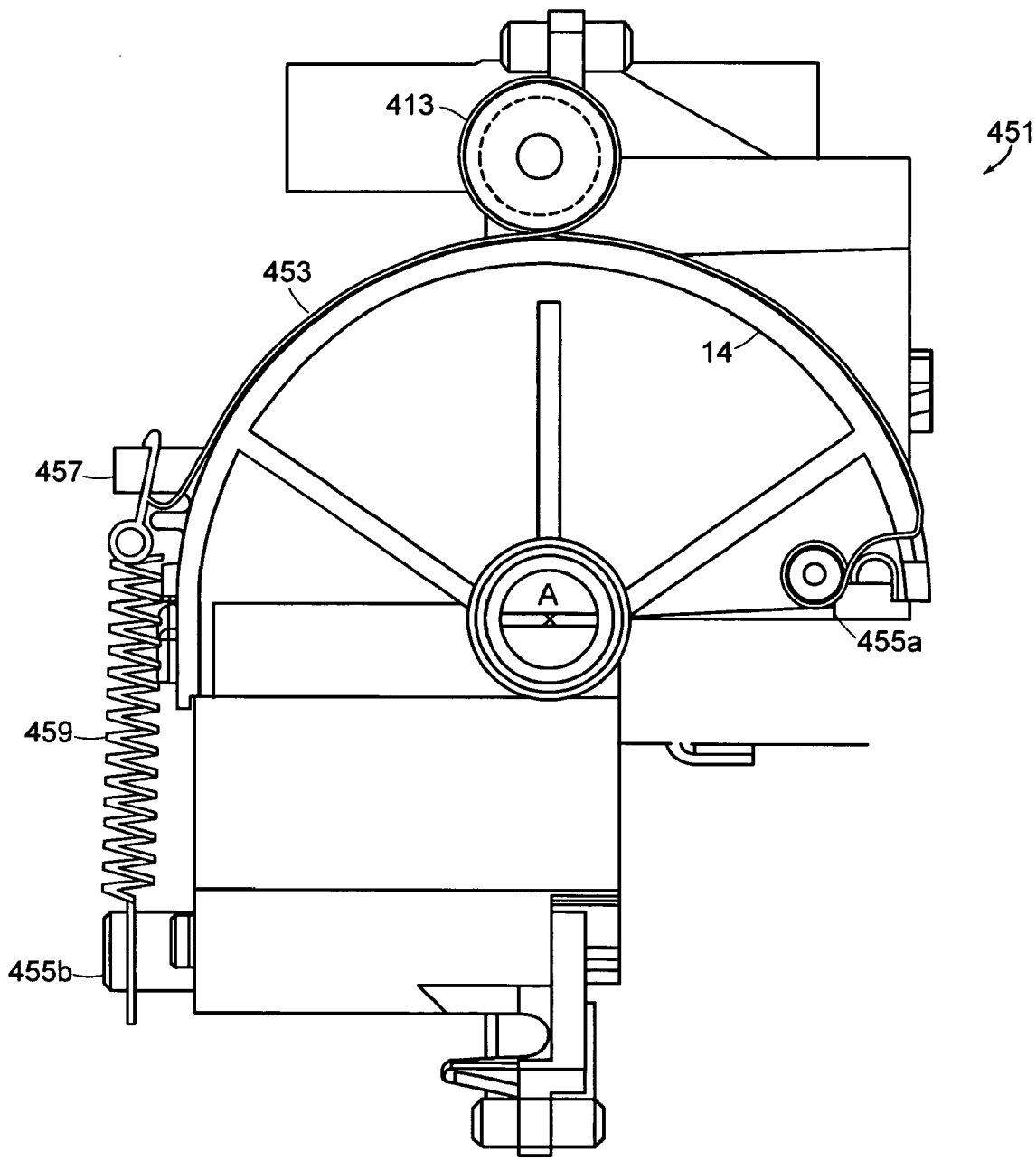
FIG. 8C is a schematic plan view of an automatic cable tensioning device employed to drive a first articulation of the haptic interface in accordance with one embodiment of the invention.

FIG. 5 depicts a rear schematic perspective view of the internal drive system of one embodiment of the haptic interface 10. The base 12 supports the first powered tracked rotary element 14 to define a first articulation 16 about the axis A having a substantially vertical orientation. A vertically oriented first actuator 401 (FIG. 1C) drives a vertically oriented first threaded capstan 413 that in turn manipulates a first cable 453 (FIG. 8C). The first cable is secured at, at least two points 455a, 455b (FIG. 8C), to the horizontally oriented first powered tracked rotary element 14, and thus rotates the first element 14 about the A axis. For a more detailed description of first motor assembly 401 and its operation, refer to FIGS. 7 and 8C and accompanying text. Mounted on the first powered tracked rotary element 14 are a second powered tracked rotary element 18 and a rotary transfer drive element 164 of the third powered tracked rotary element 22 and their associated motor assemblies 501, 601.

Both the second powered tracked rotary element 18 and the rotary transfer drive element 164 operate in a manner similar to that of the first powered tracked rotary element 14. For a more detailed description of the second motor assembly 501 and its operation, refer to FIGS. 7 and 9 and accompanying text. FIGS. 7 and 10 provide a more detailed description of the third motor assembly 601 and its operation.

The orientations of the second powered tracked rotary element 18 and rotary transfer drive element 164 and their associated motor assemblies 501, 601 allow for a very compact configuration and a reduction in overall size of the haptic interface 10. As can be seen from FIG. 5, the second motor assembly 501 and third motor assembly 601 are installed horizontally, substantially parallel to each other, in a balanced configuration about the A axis. This arrangement imparts rotational forces about the B axis on either side of the geometric center A, thus relatively evenly loading the interface 10 on both sides. In one embodiment, the torque from one rotary element is transferred through a central shaft upon which the other element rests. Similarly, the second rotary element 18 and rotary transfer drive element 164 are installed on opposite ends of the first rotary element 14. This particular arrangement eliminates the requirement for a large housing to enclose the internal components and simplifies access for repair. The balanced arrangement also more evenly distributes the overall inertia of the motors within the device, thus improving stability of the haptic interface 10 as opposed to a cantilevered arrangement. A single assembly shaft 172, installed substantially horizontal and parallel to the second and third motor assemblies 501, 601, and in line with the B axis, secures the second rotary element 18 and rotary transfer drive element 164, allowing for easy assembly. Also, an assembly rod 173 runs through shaft 172 and secures the spherical housing 56 to the interface 10; thus the need for a number of screws or other fasteners penetrating the housing 56 is eliminated.

The particular embodiment of the haptic interface 10 shown in FIG. 5 also utilizes at least one torsion spring 160 on the B axis of the interface 10. During use, the weight of the thigh 24, shin 30, yoke 36, nose 34, and stylus 40 tend to oppose many of the manipulations of the user. Naturally, due to the force of gravity, the weight of those elements induces rotation about the B axis. Such rotations are felt by the user as a sluggishness or resistance when using the haptic interface 10. In an effort to overcome these forces caused by the weight of the extension elements, previous haptic interfaces utilized bulky counterweights attached to the rotary elements. These bulky weights, however, increase the size and weight of the haptic interface. The haptic interface 10 of the present invention, however, utilizes solely the torsion spring 160, to offset the forces imposed on rotary element 18 without the need for any counterweight.

Figure 6B:
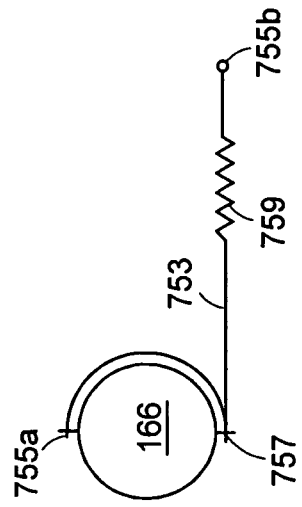
FIG. 6B is a schematic diagram of an automatic cable tensioning device employed to drive the third articulation of the haptic interface in accordance with one embodiment of the invention.
Figure 6A:
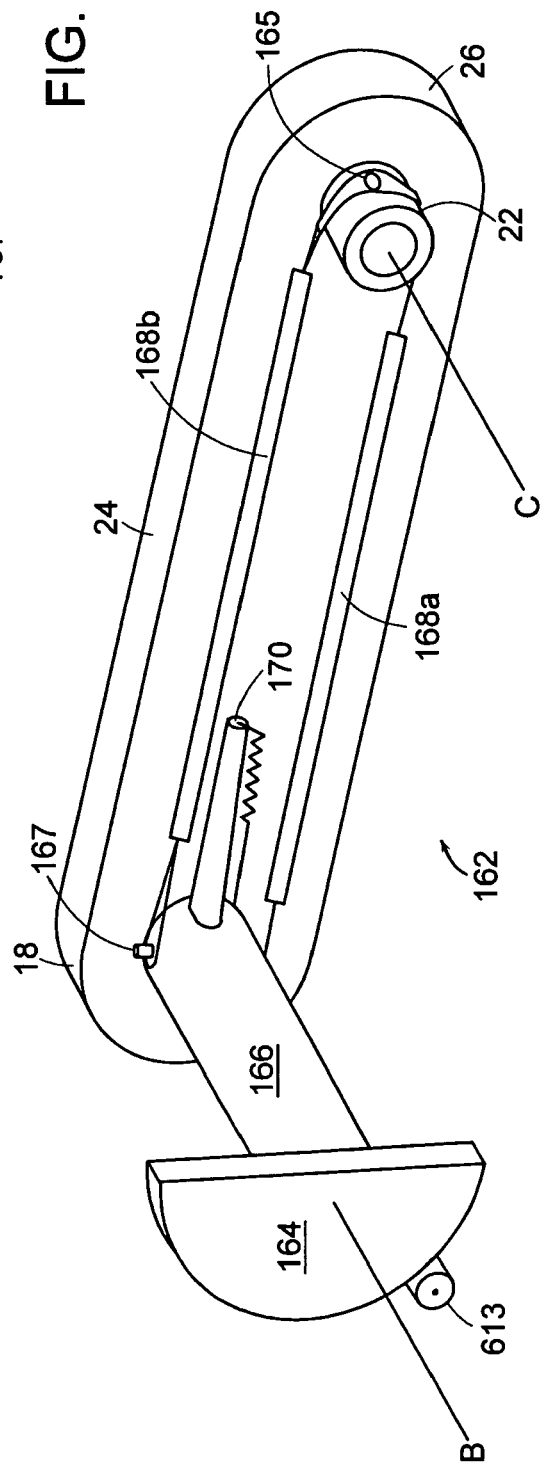
FIG. 6A is a schematic perspective view of an embodiment of a transfer drive for powering a third articulation of a haptic interface in accordance with one embodiment of the invention.

FIG. 6A depicts an embodiment of the transfer drive 162 useful in the haptic interface 10. Although the rotary transfer drive element 164 rotates about the B axis, the rotary transfer drive element 164 defines a third articulation 26 having an axis C, located on the outwardly radially disposed extension 24 of the second element 18. As a capstan 613 of the rotary transfer drive element 164 rotates, the element 164 rotates a transfer drive shaft 166 aligned with the second axis B, converting rotary motion to linear motion of first 168a and second 168b transfer drive rods disposed along the radial extension 24 of the second element 18. The first 168a and second 168b drive rods terminate in looped braided steel cable ends which are hooked onto a raised ground tab 165 of the third rotary element 22.

Accordingly, the second transfer drive rod 168b is directly grounded through looped cable ends to each of the transfer drive shaft 166 and the third rotary element 22; whereas, the first drive rod 168a is directly grounded through a looped cable end to a raised ground tab 167 of the third rotary element 22 and indirectly grounded with a single cable to the transfer drive shaft through a clutch post 757 (FIG. 6B) and spring 759. The drive rods 168a, 168b minimize cable lengths and therefore enhance the stiffness and rigidity of the transfer drive 162. The cables are used solely at the grounding points, with one cable 753 end of the first drive rod 168a being routed through the automatic cable tensioning device 751 depicted in FIG. 8A to substantially eliminate backlash in the third axis drive.

In FIG. 6B, one embodiment of a cable tensioning device 351 described later with respect to FIG. 8A is employed in the transfer drive 162 of the haptic interface 10, defined generally here as cable tensioning device 751. Depicted is the circular transfer drive shaft 166. The cable 753 (from the terminus of the first drive rod 168a) is fixed to shaft 166 at a first ground location 755a and circumscribes the shaft 166 in a clockwise direction. The cable 753 wraps around a clutch post 757, and thereafter, is attached to a spring 759 in tension, which is grounded to a radial extension 170 of shaft 166 at ground 755b. Tabs, slots, and other guide features may be provided in the shaft 166 to facilitate routing and retention of the cable 753 in the proper location and orientation throughout the range of motion of the shaft 166. The tension achieved with the automatic cable tensioning device 751 also provides added stiffness and rigidity in the drive system.

FIG. 7 shows a schematic representation of a typical actuator assembly 301 used in one embodiment the haptic interface 10. In order to track the location of the powered axes A-C, each actuator 303 is fitted with an encoder board 305 at the base of the actuator 303. An emitter/detector optical encoder chip 307 is secured on or within the board 305. Rotation of the actuator shaft 311a is tracked by mounting a reflective encoder disk 309 on an actuator shaft extension 311b extending from the actuator 303 remote from the capstan 313. By incorporating a reflective encoder disk 309, in lieu of a common non-reflective disk, the overall volume of the actuator assembly 301 is reduced, since a non-reflective disk requires the use of an emitter/detector pair that straddles an edge of the disk 309.

In an embodiment of the haptic interface 10, the emitter/detector 307 is a single unit mounted at the end of the actuator 303, directing pulses to, and receiving pulses from, the reflective encoder disk 309. As the actuator 303 causes the disk 309 to rotate, or as the disk 309 rotates due to user movement of the manipulation device 10, the emitter/detector 307 outputs pulses that are in turn reflected by the disk 309, allowing the angular orientation of the articulation to be determined. Three of these actuator assemblies 301 are used in the haptic interface 10, one for each of the powered articulations 16, 20, 26; however, more or less actuator assemblies may be employed depending on the number of powered axes.

The actuator assembly 301 uses components readily available in the market. In one embodiment, the actuator 303 is a D.C. motor. Generally, a reflective encoder disk similar to the 8000 Series manufactured by Agilent Technologies is utilized. The capstan 313 and reflective encoder disk 309 may be secured to the actuator shaft 311*a* and extension 311*b* by a variety of means, such as mechanical connections or press fit connections employing heat expansion and cooling. In a particular embodiment of the present invention, however, the capstan 313 and disk 309 are secured using a strong bonding adhesive, such as one marketed under the name Loctite®, manufactured by Henkel Consumer Adhesives, Inc., to reduce the overall size of the assembly 301.

Instead of using mechanical linkages, gears, or other force transmission components, the interface 10 employs three dedicated actuators (described above) fitted with capstans and corresponding cables to power rotary axes A-C. Cable drives provide good force transmission characteristics with low weight; however, backlash can be a problem, especially in high precision, high resolution haptic interfaces. Backlash or play in a rotary mechanical transmission, such as those employed in the interface 10, is most evident when direction of rotation is reversed. One method of reducing backlash is to provide a manual adjustment feature to adjust the position of one or both of the cable ends relative to ground so that slack in the cable can be reduced. Further, the cable can be preloaded in tension so that there is minimal slippage between the cable and the actuator capstan as the capstan rotates; however, as the cable stretches and the components of the mechanism wear over time, cable tension is reduced and must be periodically adjusted to prevent slippage. Additionally, cable tension is difficult to measure and excessive tensioning can lead to deformation of the structural elements and accelerated, premature wear in the articulation bearings.

FIG. 8A is a schematic diagram of an automatic cable tensioning device 351 that overcomes many of the limitations of known cable drives and is useful in the powered axes of the haptic interface 10. The tensioning device 351 automatically loads the cable 353 to a predetermined tension and maintains that level of tension over time, even in the event of cable stretching and component wear. The tensioning device 351 includes a cable 353 fixed at proximal and distal ends directly or indirectly to a ground surface, shown generally at 355*a*, 355*b*. A non-rotating clutch post 357, also fixed to ground, is located along the cable path. A spring 359 is disposed along the cable path between the clutch post 357 and ground 355*b*. Lastly, the actuator capstan 313 is provided along the cable path between the clutch post 357 and ground 355*a* on the side opposite the spring 359. As depicted in FIG. 8A, the cable 353 extends from ground 355*a*, circumscribes both the actuator capstan 313 and the clutch post 357 at least once each, and is connected to the spring 359 that is in tension and connected to ground 355*b*.

A non-rotating post, such as the clutch post 357, may be used to amplify or multiply an applied cable tension to resist or offset tension applied to the cable 353 downstream of the post 357. As is known by those skilled in the art, the amplification factor is a function of post diameter, wrap angle of the cable around the post, and the coefficient of friction between the cable and the post. Accordingly, for a given spring tension, as wrap angle and/or friction increases, a larger downstream cable force can be offset or resisted.

In a static state, the tension induced in the cable 353 by the spring 359 causes the cable 353 to be pulled to the right, eliminating any slack or looseness in the cable 353, cable tension being a function of the spring constant, k, and the linear displacement, x, of the spring ends from a rest state. In operation, as the actuator capstan 313 rotates in a clockwise direction, as depicted, tension is applied to the portion of the cable 353 between the capstan 313 and ground 355*a* and the capstan 313 moves to the left relative to ground 355*a*. Any looseness or slack in the cable 353 to the right of the capstan 313 is automatically taken up by the spring 359, the cable 353 sliding around the clutch post 357 whenever the spring force overcomes the frictional drag of the cable 353 around the clutch post 357.

Alternatively, when the capstan 313 rotates in a counter-clockwise direction, the capstan 313 applies tension to the cable 353 portion between the capstan 313 and the clutch post 357. As long as the spring tension enhanced by the clutch post effect exceeds the tension induced by the capstan 313, the cable 353 will be effectively locked to the clutch post 357 and will not slip around the post 357. The spring 359 will be effectively isolated from the capstan loading. Accordingly, the tensioning device 351 automatically self-adjusts and maintains cable tension at a predetermined magnitude, taking up any slack when the capstan 313 rotates in a first direction and locking when the capstan 313 rotates in a second direction.

Referring to FIG. 8B, an enlarged view of an actuator capstan 313 for use in one embodiment of the haptic interface 10 is shown. While the capstan 313 may be a uniform cylinder, in one embodiment, the capstan 313 includes a helical channel 315 formed along an exterior surface thereof. The helical channel 315 may include a generous radius without sharp edges, which could cut through the cable 353 or otherwise reduce cable life. The helical channel 315 nests and routes the cable 353, preventing overlapping or tangling of the cable 353 on the capstan 313. In one embodiment, a nylon coated cable 353 is used to prevent slippage upon the capstan 313 and to protect the cable 353 from damage to ensure a long life. A variety of cable materials can be used including, but not limited to, tungsten, stainless steel, uncoated steel, or another form of coated steel. Also, the number of wraps the cable makes around the capstan is dependant on capstan and cable size, anticipated loads, and other related considerations.

Turning now to FIG. 8C, the cable tensioning device 351 described above is employed in the first articulation 16 of the haptic interface 10, defined generally here as cable tensioning device 451. Depicted is a generally D-shaped hub portion of the first element 14. A cable 453 is fixed to the first powered tracked rotary element 14 at a first ground location 455*a* and circumscribes the element 14 in a counterclockwise direction. The cable 453 wraps an actuator capstan 413 disposed substantially tangentially to the circumference of the element 14 before wrapping several times around a clutch post 457. Thereafter, the cable 453 is attached to a spring 459 in tension, which is grounded, to the element 14 at ground 455*b*. Since the actuator is fixed in the housing 12 of the interface 10, as the actuator rotates the capstan 413, the first element 14 is caused to rotate about first axis A. Tabs, slots, and other guide features may be provided in the element 14 to facilitate routing and retention of the cable 453 in the proper location and orientation throughout the range of motion of the element 14.

As can be seen in FIG. 8C, the hub portion of the first rotary element 14 is generally D-shaped. Alternatively, a circular or partially circular element 14 is contemplated. The rotary element 14 is supported at a centrally located axis shaft on the A axis. The first rotary element 14 may be either of a segmented construction, as shown, or solid, perforated, or any other construction, as required. If required, a support surface for the other rotary elements and their associated motors may be secured to the first rotary element 14. Moreover, the A axis shaft may be hollow or include a groove to accommodate any of the control or power wiring of the haptic interface 10. Alternatively, openings may be formed within first rotary element 14 for this purpose.

Figure 9:
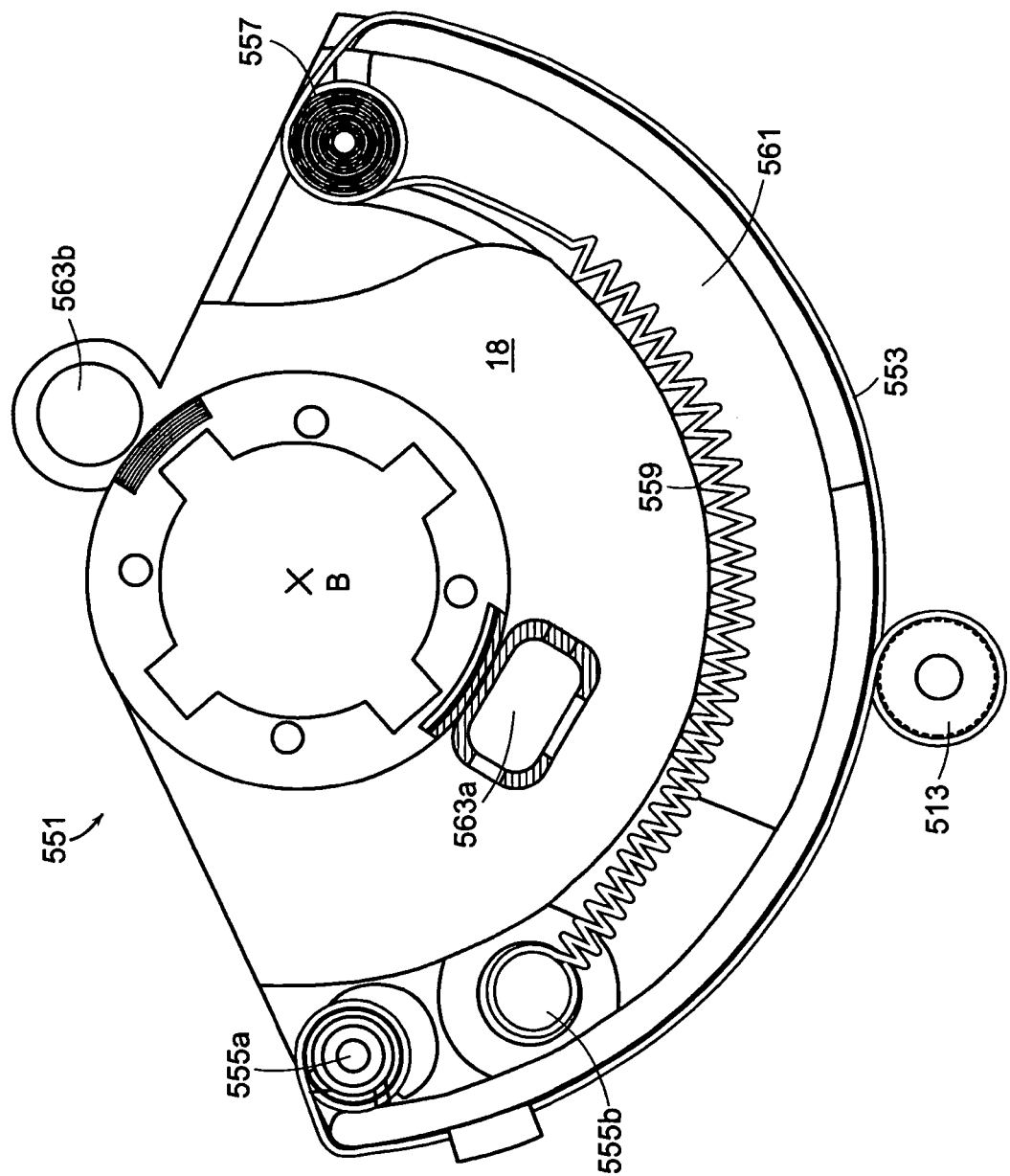
FIG. 9 is a schematic plan view of an automatic cable tensioning device employed to drive a second articulation of a haptic interface in accordance with one embodiment of the invention.

Turning now to FIG. 9, the cable tensioning device 351 described above is employed in the second articulation 20 of the haptic interface 10, defined generally here as cable tensioning device 551. Depicted is a generally D-shaped hub portion of the second element 18. A cable 553 is fixed to the element 18 at a first ground location 555a and circumscribes the element 18 in a counterclockwise direction. The cable 553 wraps an actuator capstan 513 disposed substantially tangentially to the circumference of the element 18 before wrapping several times around a clutch post 557. Thereafter, the cable 553 is routed through a recess 561 in the rotary element 18 and attached to a spring 559 in tension, which is grounded to the element 18 at ground 555b. As will be apparent to one of ordinary skill in the art, tabs, slots, and other guide features may be provided in the outer circumference of element 18 to facilitate routing and retention of the cable 553 in the proper location and orientation throughout the range of motion of the element 18.

In one embodiment of the haptic interface 10, the second rotary element 18 is penetrated by at least two control wire conduits 563a, 563b. These conduits 563a, 563b provide a location for the power and control wiring and generally restrict the wires movement as the element 18 rotates. The rotary element 18 rotates about a centrally located B axis shaft that may be smooth, include grooves or tabs, or be threaded as required. As an alternative to the D-shaped element shown in the FIG. 9, a circular rotary element may be employed. Use of a D-shaped element 18, however, can reduce the overall size of the haptic interface 10.

Similarly, in FIG. 10, the cable tensioning device 351 described above is employed in the third articulation 26 of one embodiment of the haptic interface 10, defined generally here as cable tensioning device 651. Depicted is a generally D-shaped hub portion of the rotary transfer drive element 164. A cable 653 is fixed to the element 164 at a first ground location 655a and circumscribes the element 164 in a counterclockwise direction. The cable 653 wraps an actuator capstan 613 disposed substantially tangentially to the circumference of the element 164 before wrapping several times around a clutch post 657. Thereafter, the cable 653 is routed through a recess 661 in the rotary transfer drive element 164 and attached to a spring 659 in tension which is grounded to the element 164 at ground 655b. As will be apparent to one of ordinary skill in the art, tabs, slots, and other guide features may be provided in the outer circumference of rotary transfer drive element 164 to facilitate routing and retention of the cable 653 in the proper location and orientation throughout the range of motion of the element 164.

The rotary transfer drive element 164 rotates freely about axis B. Rotational force is transferred to third articulation 26 by transfer drive shaft 166 and associated components depicted in more detail in FIGS. 6A-6B and described in the accompanying text. As an alternative to the D-shaped element shown in the FIG. 10, a circular rotary element may be employed. Use of a D-shaped element 164, however, can reduce the overall size of the haptic interface 10.

During use of the haptic interface 10, the three powered tracked rotary elements 14, 18, and 22 may be either "powered" or "free." When powered, the actuators are energized and can control the rotation of the respective rotary elements, directing the elements to either resist or force the movements of the interface user depending on the application. This powered setting is useful for force feedback situations, such as simulating surgical techniques, providing feedback during computer game play, etc. In the free setting, the actuators are not energized and the rotary elements are subject to the forces of the interface user. Such a setting is useful for digitizing drawings or objects directly into a computer program, using the user interface as a personal computer mouse, drafting computer-aided design (CAD) images, etc. Any number of the three rotary elements may be in either powered or free mode for any particular application, or may switch between the two modes when certain criteria are met.

Figure 13:
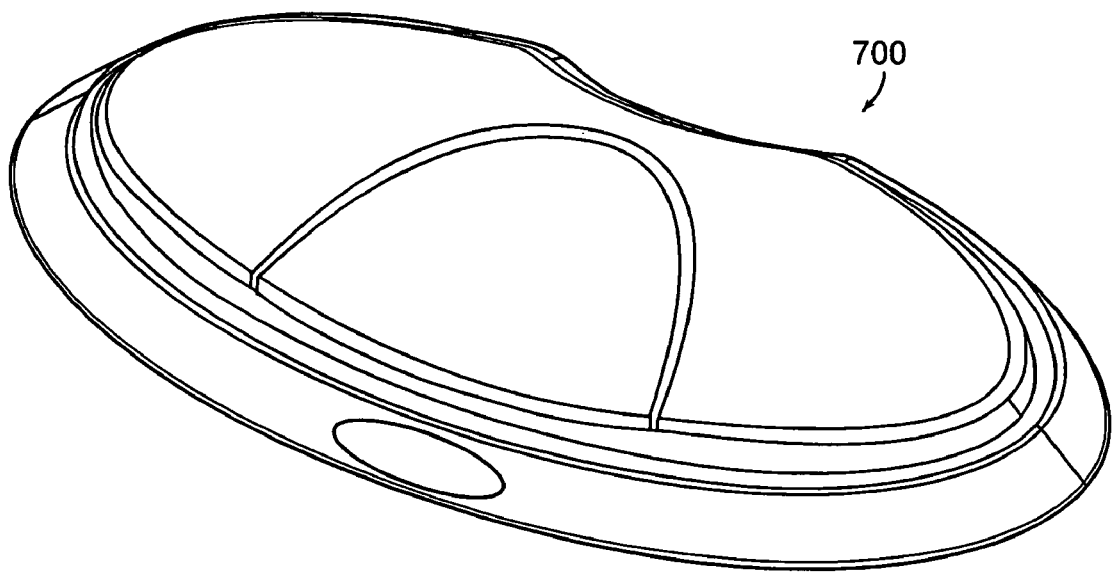
FIG. 13 is a schematic perspective view of a wrist rest to be used with a haptic interface in accordance with one embodiment of the present invention.

Light weight, low cost, high stiffness, and high strength are preferred characteristics for the moveable portions of the haptic interface. For these reasons, injection molded 40% carbon fiber filled nylon or similar compositions may be selected for the structural elements such as second element 18, second element extension 24, third element 22, third element extension 30, fifth element 34, and sixth element 40. Other glass and carbon fiber filled, injection molded plastics may be used as well. Moreover, in one embodiment, the external gripping surfaces of the stylus housing 62 are treated with an anti-slip coating or paint to prevent the stylus 40 from slipping from the user's grasp. Alternatively, the external surfaces may be physically textured or knurled as required. In one embodiment, the haptic interface 10 may be used in conjunction with a wrist rest 700 as depicted in FIG. 13. An example of such a wrist rest 700 is disclosed in U.S. Pat. No. 6,417,638. All internal components may be manufactured from plastics, metal, or any combination of such materials. Desirable characteristics for the base 12 and spherical housing 56 of the haptic interface 10 also include low cost, high strength, and high stiffness; however, because the base structure may also serve as a heat sink for the internal electronics, it is desirable that the base structure be thermally conductive.

Figure 11A:
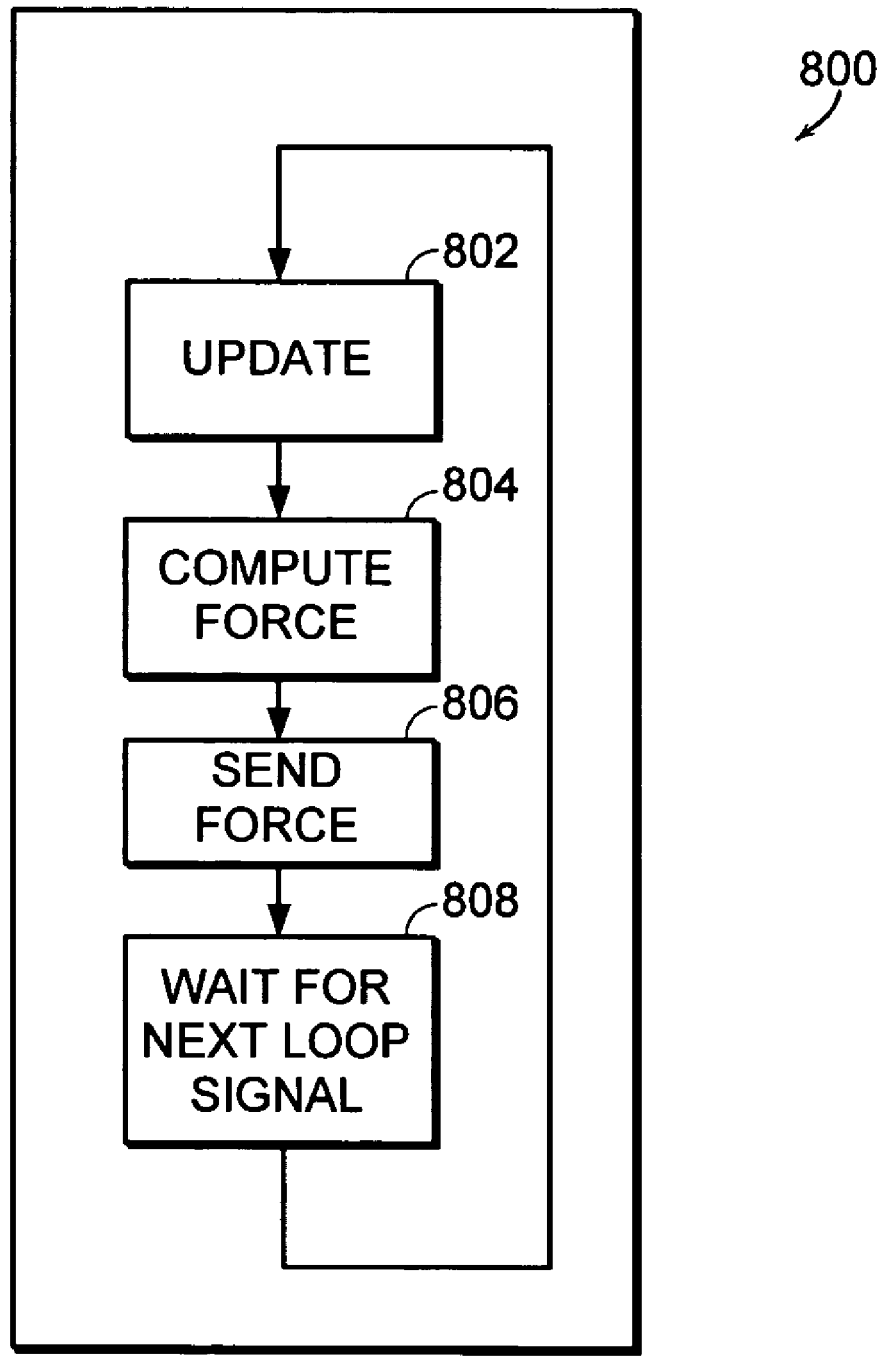
FIGS. 11A-11C are flowcharts of an algorithm for controlling and monitoring force and internal temperature of a haptic interface in accordance with one embodiment of the invention.

FIG. 11A depicts an algorithm 800 employed in one embodiment of the interface controller for measuring and controlling the forces generated by the haptic interface 10. Signals from the actuators and/or potentiometers first update 802 the force reading stored in memory. Next, a new force is computed 804, and the electrical current corresponding to that computed force is sent 806 to one of the actuators, to either rotate the associated element or resist such a rotation. The algorithm 800 then awaits a responsive signal 808 from the actuators and/or potentiometers (due to user manipulation) and updates the stored force reading 802 accordingly. This algorithm continues to operate during an entire program, translating and tracking electrical signals to allow the interface user to interact with a computer application program.

Figure 11B:
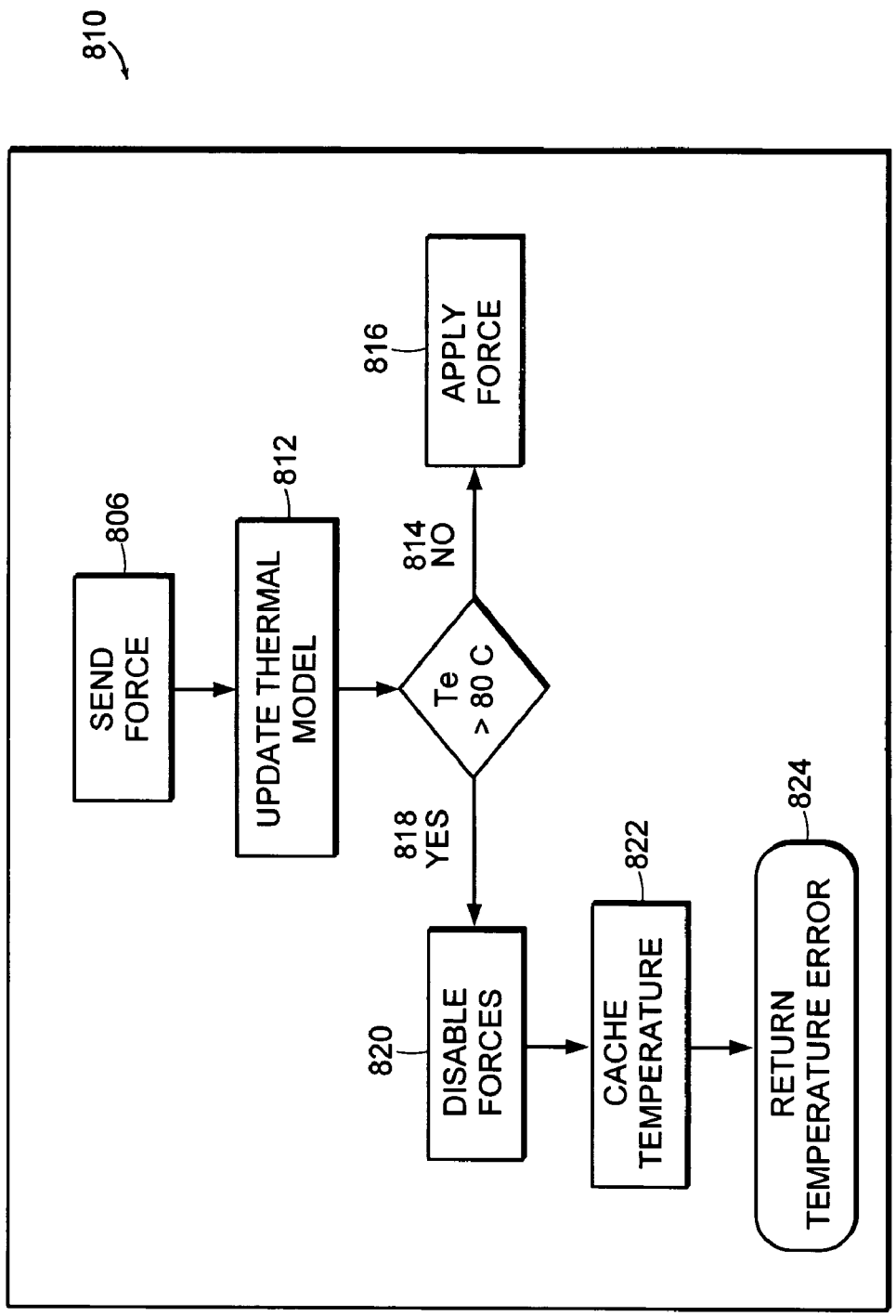

Temperature sensing devices are required in consumer products to prevent overheating and possible injury to users and to prevent damage to a device's internal components. Generally, thermocouples are used to measure temperatures of internal motors and other components to meet this requirement. One embodiment of the haptic interface 10 in accordance with the present invention, however, uses a computer algorithm to monitor temperature within the device, in the absence of any thermocouple or other sensor that directly reads internal temperature. A flowchart of such an temperature calculating algorithm 810 (a subroutine of control algorithm 800 described above) is depicted in FIG. 11B. Generally, the algorithm 810 use time and actuator current usage to estimate temperature. As electrical current is sent to an actuator to generate a force 806 upon a rotary element (to either rotate the element or resist such a rotation), the algorithm 810 measures the current delivered to the motor and the total length of delivery time. The algorithm 810 then computes the estimated internal actuator temperature based on the amount of time the current has been delivered to the actuator, thereby updating its thermal model 812.

If the result of the update is an internal temperature less than about 80° C. 814, the force is applied to the rotary element 816. If, however, the internal temperature exceeds about 80° C. 818, the force is disabled 820, and delivery of current to the actuator is terminated. Under the latter condition, the temperature data is cached 822 for application in a temperature error algorithm 830 (described below), and a temperature error message 824 is delivered to the user. This error may take the form of a notation within the associated computer program to be displayed on a computer screen and/or will result in a visible change in the LED in the haptic interface docking station to indicate a system error. The temperature limit can be adjusted, as required, for any given application or to prevent damage to internal device components. A threshold temperature of 49° C., for example, can be set to cause shutdown of the interface 10 before any damage occurs to the actuators or other internal components.

Figure 11C:
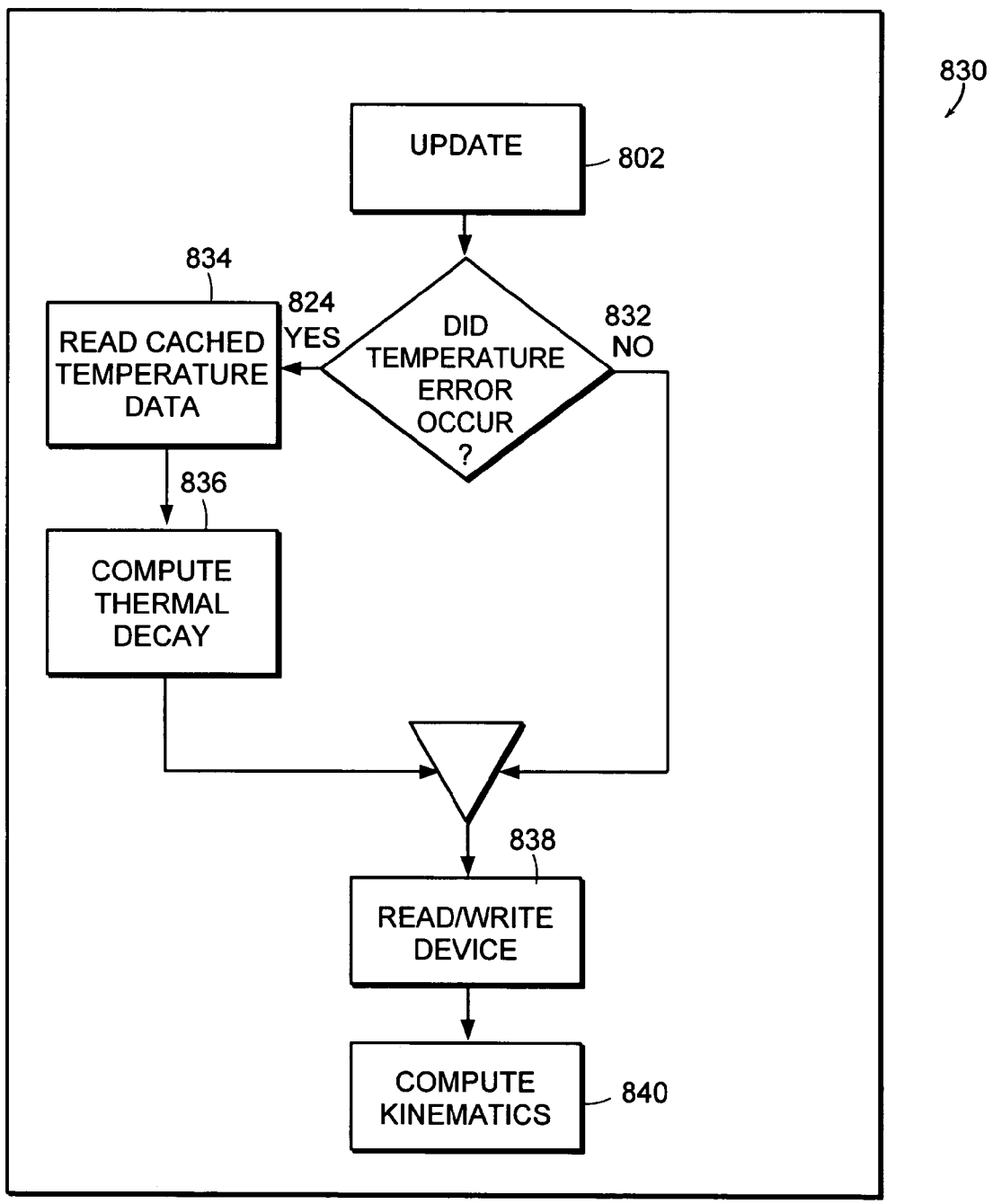

A flowchart for the temperature error algorithm 830 is depicted in FIG. 11C. Upon updating the force 802 stored in the control algorithm 800, the subroutine temperature error algorithm 830 determines the consequences of a possible temperature error. A determination that no temperature error has occurred 832 causes a bypass of steps 834 and 836. If however, the temperature calculating algorithm 810 determines that an error has occurred 824, the temperature error algorithm 830 reads the cached temperature data 834, stored in the cache temperature 822 step of the temperature calculating algorithm 810. The algorithm 830 then computes any thermal decay 836 of interface components due to the excessive temperature. Information regarding decay, and how it will affect future interface performance, is stored 838 and taken into account in any later kinematics calculations 840. Thus, as interface performance is impacted by temperature errors, the interface 10 can compensate, as required, to continue to deliver an accurate force-reproduction experience for the user.

Figure 12:
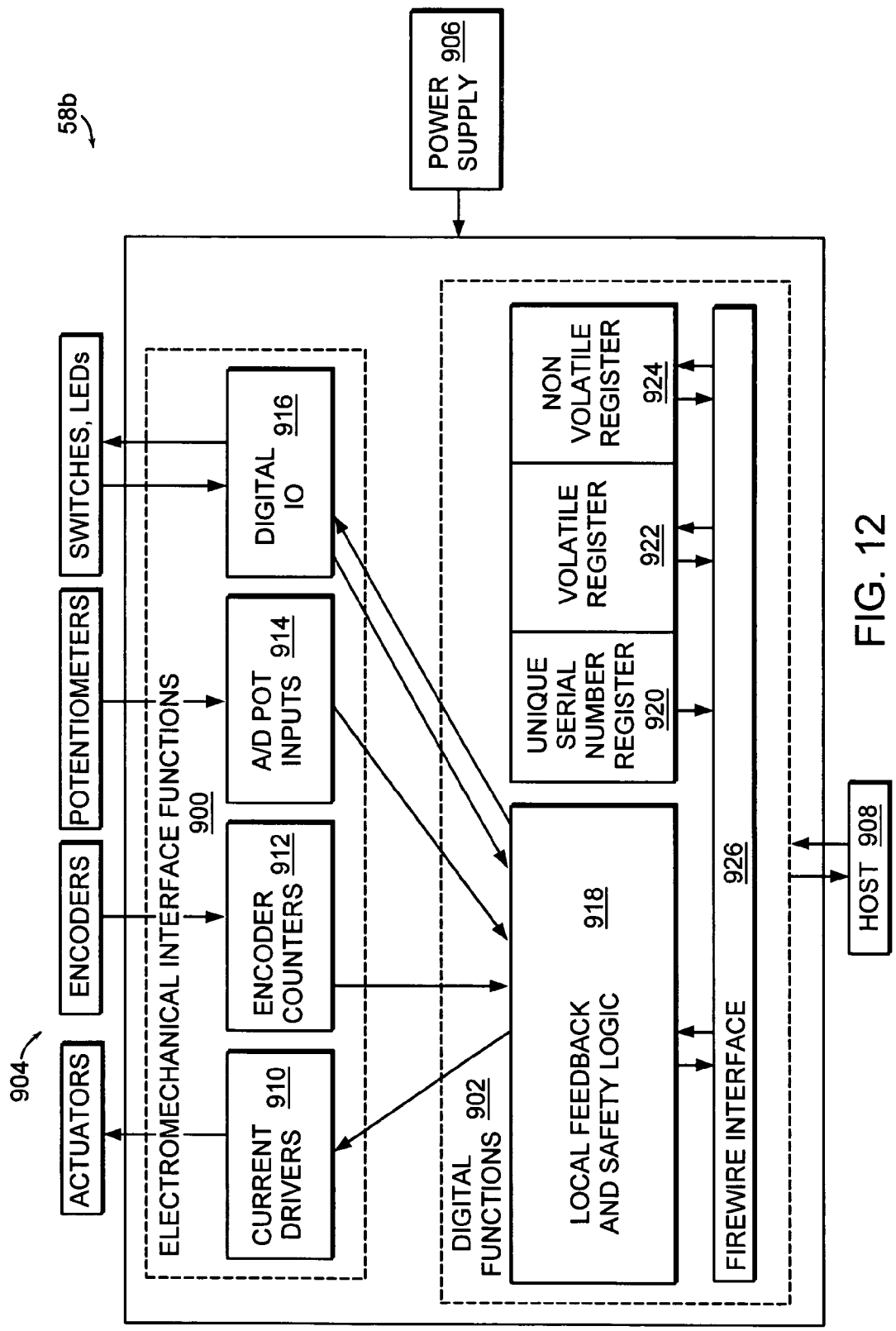
FIG. 12 is a schematic diagram of an IEEE 1394 compliant interface board useful in a haptic interface in accordance with one embodiment of the invention.

Turning now to FIG. 12, a schematic representation of the IEEE 1394 compliant interface board 58b of one embodiment of the haptic interface 10 is depicted. The board 58b controls various types of electromechanical interface 900 and digital 902 functions. The board 58b is powered by the haptic interface power supply 906. The electromechanical interface functions 900 of the board 58b ultimately control the function of the various components 904 (described in more detail above) of the haptic interface 10. Specifically, current drivers 910 control the function of the three actuators. The current drivers 904 consist of three channels, for permanent magnet D.C. servomotors. The drivers 904 operate at a maximum continuous output of 14.4 Watts per channel, plus or minus 18 volts mA. The maximum output for the three channels is 25 Watts. The drivers 904 also have 12 bits of resolution at 1 kHz bandwidth. Encoder counters 912 consist of three channels. The counters 912 can receive a rate of pulses up to 500 kHz and 16 bits of resolution. The analog potentiometer inputs 914 also have three channels, and typically recognize 0-5 volt signals from 5K Ohm potentiometers. The inputs also have 10 bits of resolution and 1 kHz of filtering with a 3-dB cutoff. Digital input/output 916 consists of four output channels and eight input channels. The digital input/output operates with debounced TTL in and TTL out with sufficient current to drive any LEDs.

The digital functions 902 of the board 58b communicate with the various electromechanical interface functions 900 and the program host computer 908 via the IEEE 1394 connection 926. Local feedback and safety logic function 918 performs several functions. These include, but are not limited to, velocity based positive feedback to compensate for back-emf of motor and friction, velocity threshold shutdown, current shutdown if threshold exceeded, and watchdog shutdown if not updated within a certain time. Also, a 32-bit read-only serial number interface 920 identifies the haptic interface 10 to the host computer. The digital functions 902 also include 32 bit read-write volatile 922 and non-volatile 924 registers. Additionally, the electronics of the interface may include an 8031 microprocessor, FLASH memory, Programmable Logic Device (PLD) and PLD-based delta sigma A/D converters, and a four-layer printed circuit card.

The microprocessor negotiates with the host computer, manages system initialization and isochronous data transfers during operation, loads the PLD configuration, and manages the FLASH memory read/write operations (to allow remote updates of the 8031 program, the PLD configuration, and system constants). The PLD implements three 16-bit quadrature encoder interfaces, encoder speed detection, power fail and over current safety logic, motor enablement monitoring, 512 byte stack RAM bank to supplement 8031 memory, FIFO interface to IEEE 1394 connection link controller isochronous data mover port, control for three nine-bit accurate delta-sigma potentiometer A/D converters, three ten-bit PWM generators to set motor currents, triangle wave frequency generator, and power supply sync frequency generator. The power board 58a (FIG. 1C) includes a power supply, safety circuitry, three PWN amplifiers, PWM-based D/A converters, and a two-layer printed circuit card.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A force reflecting haptic interface including at least three degrees of freedom and a user interface, the user interface comprising:

a nose section secured to the force reflecting haptic interface, the nose section comprising at least one electrical wiring circuit;

a user connection section detachably secured to the nose section, the nose section interchangeable with alternative user connection sections, wherein the at least one electrical wiring circuit allows for direction of an electronic signal from the user connection section to the force reflecting haptic interface; and a sensor for outputting a signal representative of a position of the user connection section relative to the nose section.

2. The force reflecting haptic interface of claim 1, wherein the user connection section is selected from the group consisting of a stylus, a pistol grip, a roller ball, a mouse, a joystick, and a steering device.

3. The force reflecting haptic interface of claim of 1, wherein the user connection section couples to the nose section by a jack and chuck arrangement.

4. The force reflecting haptic interface of claim 1, wherein the user connection section decouples from the nose section upon application of a load greater than a threshold load value.

5. The force reflecting haptic interface of claim 1, wherein the user interface further comprises a first user input on the user connection section.

6. The force reflecting haptic interface of claim 5, wherein the user interface further comprises a second user input on the user connection section.

7. The force reflecting haptic interface of claim 6, wherein at least one of the first user input and the second user input is customizable by a user.

8. The force reflecting haptic interface of claim 6, wherein at least one of the first user input and the second user input comprises a switch.

9. The force reflecting haptic interface of claim 6, wherein at least one of the first user input and the second user input modifies a function of the user interface.

10. The force reflecting haptic interface of claim 9, wherein the user interface is adapted to function as a force feedback device and a computer mouse.

11. The force reflecting haptic interface of claim 10, wherein the user interface is adapted to function as a digitizer.

12. The force reflecting haptic interface of claim 1, wherein the user interface comprises a housing, the housing comprising multiple components that interlock without requiring a fastener.

13. The force reflecting haptic interface of claim 5, wherein the first user input is connected to the at least one electrical wiring circuit.

14. The force reflecting haptic interface of claim 6, wherein the second user input is connected to the at least one electrical wiring circuit.

15. The force reflecting haptic interface of claim 6, wherein at least one of the first user input and the second user input is selected from the group consisting of a button, a toggle, and a roller.

16. The force reflecting haptic interface of claim 1, wherein the user interface comprises a docking station.

17. The force reflecting haptic interface of claim 16, wherein the docking station comprises a projection disposed on one of the user interface and a housing of the haptic interface and a mating recess formed in the other of the user interface and the housing.

18. The force reflecting haptic interface of claim 17, wherein the docking station further comprises a sensor for indicating mating of the projection in the recess.

19. The force reflecting haptic interface of claim 1, wherein the user interface is adapted to support a first function and a second function.

20. The force reflecting haptic interface of claim 19, wherein the user interface is further adapted to support a third function.

21. The force reflecting haptic interface of claim 20, wherein the third function comprises a digitizer.

22. The force reflecting haptic interface of claim 20, wherein the third function is enabled independently from the first function and the second function.

23. The force reflecting haptic interface of claim 19, wherein the first function comprises a force feedback device.

24. The force reflecting haptic interface of claim 19, wherein the second function comprises a computer mouse.

25. The force reflecting haptic interface of claim 19, wherein the user interface is switchable between the first function and the second function.

26. The force reflecting haptic interface of claim 1, wherein the nose further comprises an electrical connection.

27. The force reflecting haptic interface of claim 1, wherein the user connection section further comprises an electrical connection.

28. The force reflecting haptic interface of claim 1, wherein the nose section further comprises a tip.

29. The force reflecting haptic interface of claim 28, wherein the tip comprises at least one of a manual switch and a spring loaded switch.

30. A force reflecting haptic interface including at least three degrees of freedom and a user interface, the user interface comprising:
 a nose section comprising a pair of projections, each projection adapted to mate with a bearing;
 a yoke assembly comprising two hinged halves adapted to capture the pair of projections extending from the nose section, wherein at least one of the projections is adapted to mate with a sensor for outputting a signal representative of a position of the user interface relative to the yoke assembly; and
 a user connection section detachably coupled to the nose section, the nose section interchangeable with alternative user connection sections.

31. A force reflecting haptic interface including at least three degrees of freedom and a user interface, the user interface comprising:
 a nose section secured to the force reflecting haptic interface, the nose section comprising at least one electrical wiring circuit;
 a yoke section connected to the nose section; and
 a user connection section detachably secured to the nose section, the nose section interchangeable with alternative user connection sections, wherein the at least one electrical wiring circuit allows for direction of an electronic signal from the user connection section to the force reflecting haptic interface.

32. The force reflecting haptic interface of claim 31, wherein the yoke assembly comprises two hinged halves adapted to capture a pair of projections extending from the nose section.

33. The force reflecting haptic interface of claim 32, wherein the yoke assembly further comprises a pair of bearings, the pair of bearings adapted to capture the pair of projections.

34. The force reflecting haptic interface of claim 33, wherein the two hinged halves clamp the pair of bearings with positive pressure.

35. The force reflecting haptic interface of claim 32, wherein each projection is adapted to mate with a bearing and at least one of the projections is adapted to mate with a sensor for outputting a signal representative of a position of the user interface relative to the yoke assembly.

\* \* \* \* \*